(12) United States Patent
Kaneda

(10) Patent No.: US 6,891,972 B2
(45) Date of Patent: May 10, 2005

(54) COMMUNICATION SYSTEM AND CONTROL METHOD THEREOF, AND COMPUTER-READABLE MEMORY

(75) Inventor: Kitahiro Kaneda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/212,434

(22) Filed: Dec. 16, 1998

(65) Prior Publication Data

US 2002/0061137 A1 May 23, 2002

(30) Foreign Application Priority Data

| Dec. 19, 1997 | (JP) | ............................................. 9-351710 |
| Dec. 19, 1997 | (JP) | ............................................. 9-351711 |
| Dec. 24, 1997 | (JP) | ............................................. 9-355761 |
| Dec. 25, 1997 | (JP) | ............................................. 9-358518 |
| Dec. 25, 1997 | (JP) | ............................................. 9-358519 |
| Dec. 25, 1997 | (JP) | ............................................. 9-358520 |

(51) Int. Cl.[7] ............................. G06K 9/00; G06K 9/68; G06F 15/16
(52) U.S. Cl. ........................ 382/187; 382/219; 709/203
(58) Field of Search ................................. 382/186, 187, 382/188, 190, 217, 218, 219; 709/201, 203

(56) References Cited

U.S. PATENT DOCUMENTS

| 5,235,654 | A | * | 8/1993 | Anderson et al. ........... 382/180 |
| 5,546,538 | A | * | 8/1996 | Cobbley et al. ............. 709/203 |
| 5,796,863 | A | * | 8/1998 | Lyon ........................... 382/157 |
| 5,802,179 | A | * | 9/1998 | Yamamoto .................... 380/51 |
| 5,848,187 | A | * | 12/1998 | Bricklin et al. ............. 382/187 |
| 5,982,928 | A | * | 11/1999 | Shimada et al. ............ 382/187 |
| 6,041,133 | A | * | 3/2000 | Califano et al. ............ 382/124 |

FOREIGN PATENT DOCUMENTS

| JP | 58-182956 | * | 10/1983 | ............ H04N/1/40 |

* cited by examiner

Primary Examiner—Mehrdad Dastouri
(74) Attorney, Agent, or Firm—Fitzpatrick, Cella, Harper & Scinto

(57) ABSTRACT

A mobile terminal reads a read manuscript as image data. A character recognition block performs character recognition from the image data, which is read, on the basis of a threshold for judgement of unrecognizableness. A character recognition result is transmitted to a central control unit, or the threshold for judgement of unrecognizableness is received from the central control unit in a threshold receiver. On the other hand, the central control unit receives the result of character recognition from the mobile terminal, or transmits the threshold for judgement of unrecognizableness from a threshold transmitter to the mobile terminal. Furthermore, the central control unit controls the threshold for judgement of unrecognizableness with a threshold controller.

21 Claims, 17 Drawing Sheets

COMMUNICATION SYSTEM AND CONTROL METHOD THEREOF, AND COMPUTER-READABLE MEMORY

BACKGROUND OF THE INVENTION

The present invention relates to a communication system, which performs communication between a terminal and a central control unit, and a control method thereof, and computer-readable memory.

Generally speaking, a terminal having a character recognition unit transfers the result of character recognition in the terminal to a central control unit, and the central control unit performs post-processing such as error correction, search, and storage of the result of character recognition. At this time, if the terminal judges that the accuracy of a candidate for character recognition is low, the terminal informs the central control unit of being unrecognizable by sending a predetermined identifier (hereinafter, this is called a rejection code) to the central control unit as the candidate for character recognition being unrecognizable.

As for the rejection code, probability (hereinafter, this is called similarity) of each recognition candidate character is calculated, and if it is lower than a predetermined threshold, it is judged that the character is unrecognizable. Therefore, as shown in FIG. 17, generally speaking, if frequency of the rejection code (hereinafter, this is called a rejection ratio) is high, that is, if a threshold of the similarity is high, the similarity of the character that is judged to be recognizable becomes relatively high and its correct solution ratio becomes also high. On the contrary, if the rejection ratio is low, the correct solution ratio of the character is apt to be low even if it is judged that the character is recognizable.

Nevertheless, in a communication system that performs communication between the conventional terminal and central control unit, the rejection ratio is inherent, that is, the threshold of the similarity is fixed. Owing to this, for example, if the rejection ratio varies due to a state change of character recognition in each terminal, the central control unit can treat nothing against that, and hence it is inevitable that efficiency of post-processing decrease.

SUMMARY OF THE INVENTION

The present invention is invented in consideration of the above problems, and an object thereof is to provide a communication system and a control method thereof, which increase processing efficiency in a communication system that performs communication between a terminal, performing character recognition, and a central control unit, and computer-readable memory.

A communication system according to the present invention for achieving the above object comprises the following construction. Thus, the communication system performs communication between a terminal and a central control unit, the terminal comprising:

read means for reading a manuscript as image data;

character recognition means for performing character recognition from the image data, read by the read means, on the basis of a control signal; and first communication means for transmitting a result of character recognition in the character recognition means to the central control unit or receiving the control signal from the central control unit;

the central control unit comprising:

second communication means for receiving the result of character recognition in the character recognition means from the terminal or transmitting the control signal to the terminal; and control means for controlling the control signal on the basis of the result of character recognition in the character recognition means, which the second communication means receives.

A control method for a communication system according to the present invention for achieving the above object comprises the following construction. Thus, the control method is for a communication system that performs communication between a terminal and a central control unit, the control method comprising:

a read step of reading a manuscript as image data;

a character recognition step of performing character recognition from the image data, read at the read step, on the basis of a control signal;

a first communication step of transmitting a result of character recognition at the character recognition step to the central control unit or receiving the control signal from the central control unit;

a second communication step of receiving the result of character recognition at the character recognition step from the terminal or transmitting the control signal to the terminal; and a control step of controlling the control signal on the basis of the result of character recognition at the character recognition step, which the second communication step receives.

Computer-readable memory according to the present invention for achieving the above object comprises the following construction. Thus, the computer-readable memory stores program code for controlling a communication system that performs communication between a terminal and a central control unit, the computer-readable memory comprising:

program code for a read step of reading a manuscript as image data;

program code for a character recognition step of performing character recognition from the image data, read at the read step, on the basis of a control signal;

program code for a first communication step of transmitting a result of character recognition at the character recognition step to the central control unit or receiving the control signal from the central control unit;

program code for a second communication step of receiving the result of character recognition at the character recognition step from the terminal or transmitting the control signal to the terminal; and program code for a control step of controlling the control signal on the basis of the result of character recognition at the character recognition step, which the second communication step receives.

A communication system according to the present invention for achieving the above object comprises the following construction. Thus, the communication system performs communication between a terminal and a central control unit, the terminal comprising:

read means for reading a manuscript, including a manuscript ID showing a kind of the manuscript, as image data;

storage means for storing a recognition dictionary group each corresponding to an attribute of data;

character recognition means for performing character recognition from the image data, read by the read means, with selecting a recognition dictionary, based on a control signal, from the recognition dictionary group stored in the storage means;

manuscript ID recognition means for recognizing the manuscript ID from the image data; and first communication means for transmitting a result of character recognition in the character recognition means and a result of manuscript ID recognition in the manuscript ID recognition means to the central control unit or receiving the control signal from the central control unit;

the central control unit comprising:

second communication means for receiving the result of character recognition in the character recognition means and the result of manuscript ID recognition in the manuscript ID recognition means from the terminal or transmitting the control signal to the terminal; and control means for controlling the control signal on the basis of the result of manuscript ID recognition in the manuscript ID recognition means, which the second communication means receives.

A control method for a communication system according to the present invention for achieving the above object comprises the following construction. Thus, the control method is for a communication system that performs communication between a terminal and a central control unit, the control method comprising:

a read step of reading a manuscript, including a manuscript ID showing a kind of the manuscript, as image data;

a character recognition step of performing character recognition from the image data, read at the read step, with selecting a recognition dictionary, based on a control signal, from a recognition dictionary group whose members each correspond to each attribute of data;

a manuscript ID recognition step of recognizing the manuscript ID from the image data;

a first communication step of transmitting a result of character recognition at the character recognition step and a result of manuscript ID recognition at the manuscript ID recognition step to the central control unit or receiving the control signal from the central control unit;

a second communication step of receiving the result of character recognition at the character recognition step and the result of manuscript ID recognition at the manuscript ID recognition step from the terminal or transmitting the control signal to the terminal; and a control step of controlling the control signal on the basis of the result of manuscript ID recognition at the manuscript ID recognition step, which the second communication step receives.

Computer-readable memory according to the present invention for achieving the above object comprises the following construction. Thus, the computer-readable memory stores program code for controlling a communication system that performs communication between a terminal and a central control unit, the computer-readable memory comprising:

program code for a read step of reading a manuscript, including a manuscript ID showing a kind of the manuscript, as image data;

program code for a character recognition step of performing character recognition from the image data, read at the read step, with selecting a recognition dictionary from a recognition dictionary group whose members each correspond to each attribute of data, on the basis of a control signal;

program code for a manuscript ID recognition step of recognizing the manuscript ID from the image data;

program code for a first communication step of transmitting a result of character recognition at the character recognition step and a result of manuscript ID recognition at the manuscript ID recognition step to the central control unit or receiving the control signal from the central control unit;

program code for a second communication step of receiving the result of character recognition at the character recognition step and the result of manuscript ID recognition at the manuscript ID recognition step from the terminal or transmitting the control signal to the terminal; and program code for a control step of controlling the control signal on the basis of the result of manuscript ID recognition at the manuscript ID recognition step, which the second communication step receives.

A communication system according to the present invention for achieving the above object comprises the following construction. Thus, the communication system performs communication between a terminal and a central control unit, the terminal comprising:

read means for reading a manuscript as image data;

character recognition means for performing character recognition from the image data, read by the read means, on the basis of a control signal; and first communication means for transmitting a result of character recognition in the character recognition means to the central control unit or receiving the control signal from the central control unit;

the central control unit comprising:

input means for inputting the control signal; and second communication means for receiving the result of character recognition in the character recognition means from the terminal or transmitting the control signal, which is inputted from the input means, to the terminal.

A control method of a communication system according to the present invention for achieving the above object comprises the following construction. Thus, the control method is for a communication system that performs communication between a terminal and a central control unit, the control method comprising:

a read step of reading a manuscript as image data;

a character recognition step of performing character recognition from the image data, read at the read step, on the basis of a control signal;

a first communication step of transmitting a result of character recognition at the character recognition step to the central control unit or receiving the control signal from the central control unit;

an input step of inputting the control signal; and a second communication step of receiving the result of character recognition at the character recognition step from the terminal or transmitting the control signal, which is inputted at the input step, to the terminal.

Computer-readable memory according to the present invention for achieving the above object comprises the following construction. Thus, the computer-readable memory stores program code for controlling a communication system that performs communication between a terminal and a central control unit, the computer-readable memory comprising:

program code for a read step of reading a manuscript as image data;

program code for a character recognition step of performing character recognition from the image data, read at the read step, on the basis of a control signal;

program code for a first communication step of transmit- ting a result of character recognition at the character recognition step to the central control unit or receiving the control signal from the central control unit;

program code for an input step of inputting the control signal; and program code for a second communication step of receiving the result of character recognition at the character recognition step from the terminal or transmitting the control signal, which is inputted at the input step, to the terminal.

A communication system according to the present invention for achieving the above object comprises the following construction. Thus, the communication system performs communication between a terminal and a central control unit, the terminal comprising:

read means for reading a manuscript, including a manuscript ID showing a kind of the manuscript, as image data;

character recognition means for performing character recognition from the image data, read by the read means, on the basis of a control signal;

manuscript ID recognition means for recognizing the manuscript ID from the image data; and first communication means for transmitting a result of character recognition in the character recognition means and a result of manuscript ID recognition in the manuscript ID recognition means to the central control unit or receiving the control signal from the central control unit;

the central control unit comprising:

second communication means for receiving the result of character recognition in the character recognition means and the result of manuscript ID recognition in the manuscript ID recognition means from the terminal or transmitting the control signal to the terminal; and control means for controlling the control signal on the basis of the result of manuscript ID recognition in the manuscript ID recognition means, which the second communication means receives.

A control method of the communication system according to the present invention for achieving the above object comprises the following construction. Thus, the control method is for a communication system that performs communication between a terminal and a central control unit, the control method comprising:

a read step of reading a manuscript, including a manuscript ID showing a kind of the manuscript, as image data;

a character recognition step of performing character recognition from the image data, read at the read step, on the basis of a control signal;

a manuscript ID recognition step of recognizing the manuscript ID from the image data; and a first communication step of transmitting a result of character recognition at the character recognition step and a result of manuscript ID recognition at the manuscript ID recognition step to the central control unit or receiving the control signal from the central control unit;

a second communication step of receiving the result of character recognition at the character recognition step and the result of manuscript ID recognition at the manuscript ID recognition step from the terminal or transmitting the control signal to the terminal; and a control step of controlling the control signal on the basis of the result of manuscript ID recognition at the manuscript ID recognition step, which the second communication step receives.

Computer-readable memory according to the present invention for achieving the above object comprises the following construction. Thus, the computer-readable memory stores program code for controlling a communication system that performs communication between a terminal and a central control unit, the computer-readable memory comprising:

program code for a read step of reading a manuscript, including a manuscript ID showing a kind of the manuscript, as image data;

program code for a character recognition step of performing character recognition from the image data, read at the read step, on the basis of a control signal;

program code for a manuscript ID recognition step of recognizing the manuscript ID from the image data; and program code for a first communication step of transmitting a result of character recognition at the character recognition step and a result of manuscript ID recognition at the manuscript ID recognition step to the central control unit or receiving the control signal from the central control unit;

program code for a second communication step of receiving the result of character recognition at the character recognition step and the result of manuscript ID recognition at the manuscript ID recognition step from the terminal or transmitting the control signal to the terminal; and program code for a control step of controlling the control signal on the basis of the result of manuscript ID recognition at the manuscript ID recognition step, which the second communication step receives.

A communication system according to the present invention for achieving the above object comprises the following construction. Thus, the communication system performs communication between a terminal and a central control unit, the terminal comprising:

read means for reading a manuscript as image data;

character recognition means for dividing the image data, read by the read means, into recognition areas each having the same attribute and performing character recognition on the basis of a control signal corresponding to each recognition area being divided; and first communication means for transmitting positional information, showing the recognition areas respectively, and a result of character recognition every recognition area to the central control unit or receiving the control signal from the central control unit;

the central control unit comprising:

second communication means for receiving the positional information, showing the recognition areas respectively, and the result of character recognition every recognition area from the terminal or transmitting the control signal to the terminal; and control means for controlling the control signal every recognition area on the basis of the positional information, showing the recognition areas respectively, and the result of character recognition every recognition area, which the second communication means receives.

A control method of the communication system according to the present invention for achieving the above object comprises the following construction. Thus, the control method is for a communication system that performs communication between a terminal and a central control unit, the control method comprising:

a read step of reading a manuscript as image data;

a character recognition step of dividing image data, read at the read step, into recognition areas each having the same attribute and performing character recognition on the basis of a control signal corresponding to each recognition area being divided;

a first communication step of transmitting positional information, showing the recognition areas respectively, and a result of character recognition every recognition area to the central control unit or receiving the control signal from the central control unit;

a second communication step of receiving the positional information, showing the recognition areas respectively, and the result of character recognition every recognition area from the terminal or transmitting the control signal to the terminal; and a control step of controlling the control signal every recognition area on the basis of the positional information, showing the recognition areas respectively, and the result of character recognition every recognition area, which the second communication step receives.

Computer-readable memory according to the present invention for achieving the above object comprises the following construction. Thus, the computer-readable memory stores program code for controlling a communication system that performs communication between a terminal and a central control unit, the computer-readable memory comprising:

program code for a read step of reading a manuscript as image data;

program code for a character recognition step of dividing the image data, read at the read step, into recognition areas each having the same attribute and performing character recognition on the basis of a control signal corresponding to each recognition area being divided;

program code for a first communication step of transmitting positional information, showing the recognition areas respectively, and a result of character recognition every recognition area to the central control unit or receiving the control signal from the central control unit;

program code for a second communication step of receiving the positional information, showing the recognition areas respectively, and the result of character recognition every recognition area from the terminal or transmitting the control signal to the terminal; and program code for a control step of controlling the control signal every recognition area on the basis of the positional information, showing the recognition areas respectively, and the result of character recognition every recognition area, which the second communication step receives.

A communication system according to the present invention for achieving the above object comprises the following construction. Thus, the communication system performs communication between a terminal and a central control unit, the terminal comprising:

read means for reading a manuscript as image data;

character recognition means for performing character recognition from the image data read by the read means; and first communication means for transmitting a result of character recognition in the character recognition means to the central control unit;

the central control unit comprising:

second communication means for receiving the result of character recognition in the character recognition means from the terminal;

display means for displaying the result of character recognition in the character recognition means, which the second communication means receives;

input means for inputting an instruction for performing processing of the result of character recognition; and post-processing means for performing post-processing of the result of character recognition on the basis of the input with the input means.

A control method of the communication system according to the present invention for achieving the above object comprises the following construction. Thus, the control method is for a communication system that performs communication between a terminal and a central control unit, the control method comprising:

a read step of reading a manuscript as image data;

a character recognition step of performing character recognition from the image data read at the read step;

a first communication step of transmitting a result of character recognition at the character recognition step to the central control unit;

a second communication step of receiving the result of character recognition at the character recognition step from the terminal;

a display step for displaying the result of character recognition at the character recognition step, which is received at the second communication step;

an input step of inputting an instruction for performing processing of the result of character recognition; and a post-processing step for performing post-processing of the result of character recognition on the basis of the input at the input step.

Computer-readable memory according to the present invention for achieving the above object comprises the following construction. Thus, the computer-readable memory stores program code for controlling a communication system that performs communication between a terminal and a central control unit, the computer-readable memory comprising:

program code for a read step of reading a manuscript as image data;

program code for a character recognition step of performing character recognition from the image data read at the read step;

program code for a first communication step of transmitting a result of character recognition at the character recognition step to the central control unit;

program code for a second communication step of receiving the result of character recognition at the character recognition step from the terminal;

program code for a display step for displaying the result of character recognition at the character recognition step, which is received at the second communication step;

program code for an input step of inputting an instruction for performing processing of the result of character recognition; and program code for a post-processing step for performing post-processing of the result of character recognition on the basis of the input at the input step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will be described in detail with reference to drawings.

<Embodiment 1>

Figure 1:
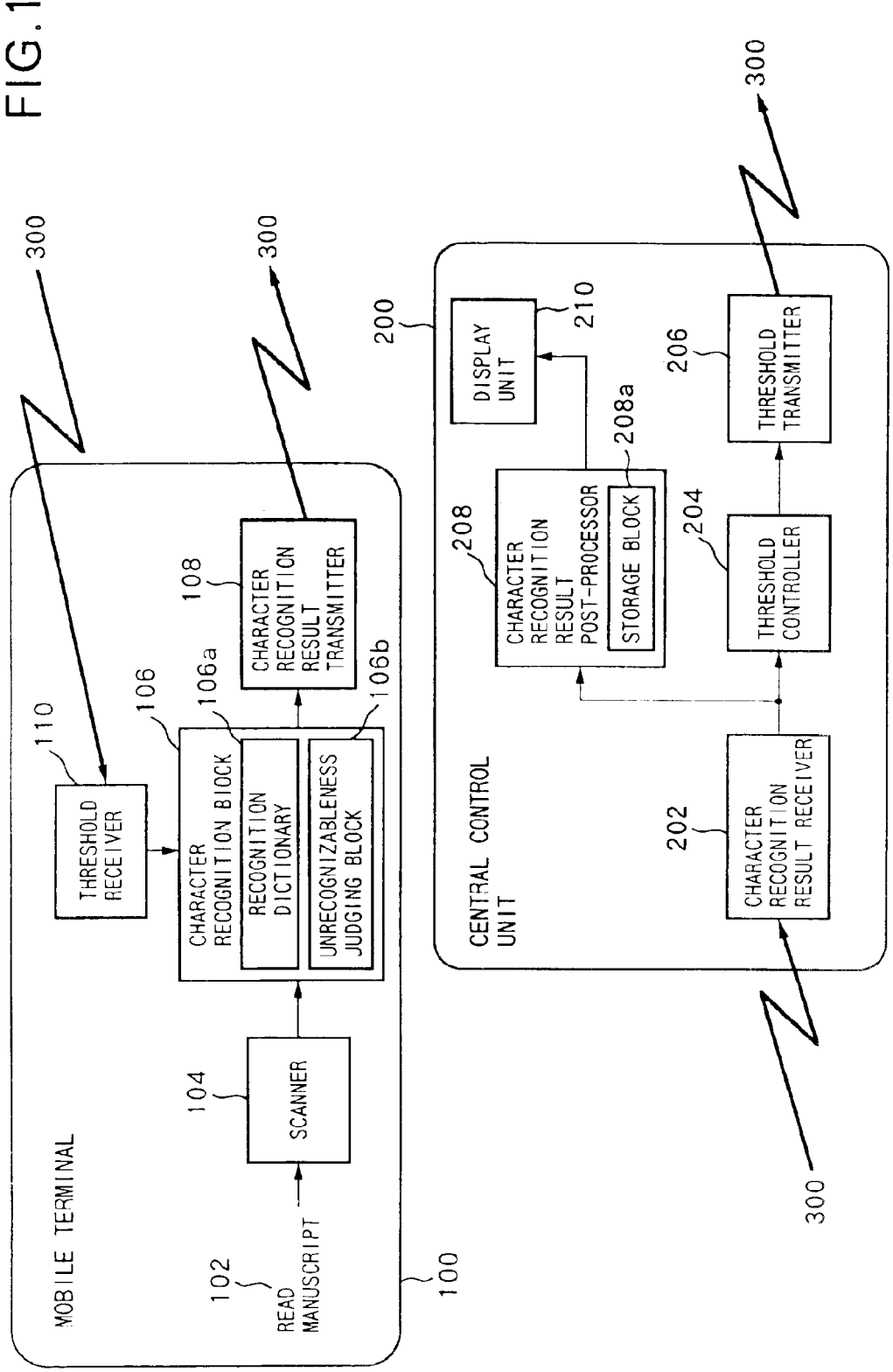
FIG. 1 is a block diagram showing the construction of a communication system of a first embodiment according to the present invention.

FIG. 1 is a block diagram showing the construction of a communication system of a first embodiment according to the present invention.

As shown in FIG. 1, the communication system is composed of a mobile terminal 100 and a central control unit 200. In addition, the mobile terminal 100 and central control unit 200 are connected via a wireless network 300. Furthermore, here, one mobile terminal 100 and one central control unit 200 constructs the communication system, but the first embodiment can be also applied to a case of a communication system comprising a plurality of mobile terminals 100. Moreover, in case each mobile terminal of the plurality of mobile terminals 100 communicates with the central control unit 200, the central control unit 200 can identify each mobile terminal by starting communication, for example, after each mobile terminal issuing an identification signal different from others to the central control unit 200.

In a mobile terminal 100, symbol 102 shows a read manuscript. Symbol 104 shows a scanner reading the read manuscript 102 and generating an image signal. Symbol 106 shows a character recognition block performing character recognition of the image signal generated in the scanner 104 with using a recognition dictionary 106a. Symbol 106b shows an unrecognizableness judging block judging whether a character recognition candidate outputted by the character recognition block 106 is unrecognizable, on the basis of a threshold for judgement of unrecognizableness. Symbol 108 shows a character recognition result transmitter transmitting the result of character recognition by the character recognition block 106 to the central control unit 200. Symbol 110 shows a threshold receiver receiving the threshold for judgement of unrecognizableness from the central control unit 200.

In the central control unit 200, symbol 202 shows a character recognition result receiver receiving the result of character recognition from the mobile terminal 100. Symbol 208 is a character recognition result post-processor performing post-processing of the result of character recognition received by the character recognition result receiver 202. Symbol 208a shows a storage block storing data such as processing-result by the character recognition result post-processor 208. Symbol 210 shows a display unit displaying the processing-result by the character recognition result post-processor 208. Symbol 204 shows a threshold controller setting a threshold for judgement of unrecognizableness from the result of character recognition received by the character recognition result receiver 202. Symbol 206 shows a threshold transmitter transmitting the threshold for judgement of unrecognizableness set by the threshold controller 204 to the mobile terminal 100.

In addition, in each of the mobile terminal 100 and central control unit 200, a CPU, RAM, and ROM, which are not shown, are mounted. A CPU mounted in each terminal executes various programs after developing the various programs that are stored in the ROM and are used for controlling equipment. In addition, the RAM also functions as a working area and a temporary save area.

Next, the operation of the communication system of the first embodiment will be described with reference to FIG. 1.

From the read manuscript 102 prepared in the mobile terminal 100, an image signal is generated by the scanner 104. The image signal is sent to the character recognition block 106, where character recognition is performed. The threshold receiver 110 receives the threshold for judgement of unrecognizableness, set in the threshold controller 204 of the central control unit 200, via the wireless network 300. Here, the character recognition block 106 compares the threshold for judgement of unrecognizableness, received by the threshold receiver 110, with similarity of each recognition candidate character. If the similarity of the recognition candidate character is larger than the threshold for judgement of unrecognizableness as a result of the comparison, the character recognition block 106 outputs a character code, corresponding to the recognition candidate character, as a recognition result. On the other hand, if the similarity of the recognition candidate character is less than the threshold for judgement of unrecognizableness, the block 106 outputs a predetermined rejection code as an unrecognizable character. In addition, the detail of the processing executed in the character recognition block 106 will be described later. The character recognition result transmitter 108 transmits a character code, which is the result of character recognition, and a rejection code, which shows unrecognizableness, to the central control unit 200 via the wireless network 300.

On the other hand, in the central control unit 200, first, the character recognition result receiver 202 receives the result of character recognition that is transmitted from the mobile terminal 100. The result of character recognition that is received is corrected by the character recognition result post-processor 208, is stored by the storage block 208a, and is processed like searching data, stored in the storage block 208a, with using the result of character recognition as a key. The processing-result is displayed on the display unit 210. The threshold controller 204 judges a number of results of character recognition that are received by the character recognition result receiver 202, and sets the optimum threshold for judgement of unrecognizableness in the unrecognizable judging block 106 of the mobile terminal 100. In addition, detail of the processing executed in the threshold controller 204 will be described later. The threshold for judgement of unrecognizableness set in the threshold controller 204 is transmitted to the mobile terminal 100 by the threshold transmitter 206 via the wireless network 300.

Next, the processing executed in the first embodiment will be described with reference to FIGS. 2 and 3. In addition, in particular, the processing executed in the character recognition block 106 and threshold controller 204 that are important parts of the first embodiment will be described in detail.

Figure 2:
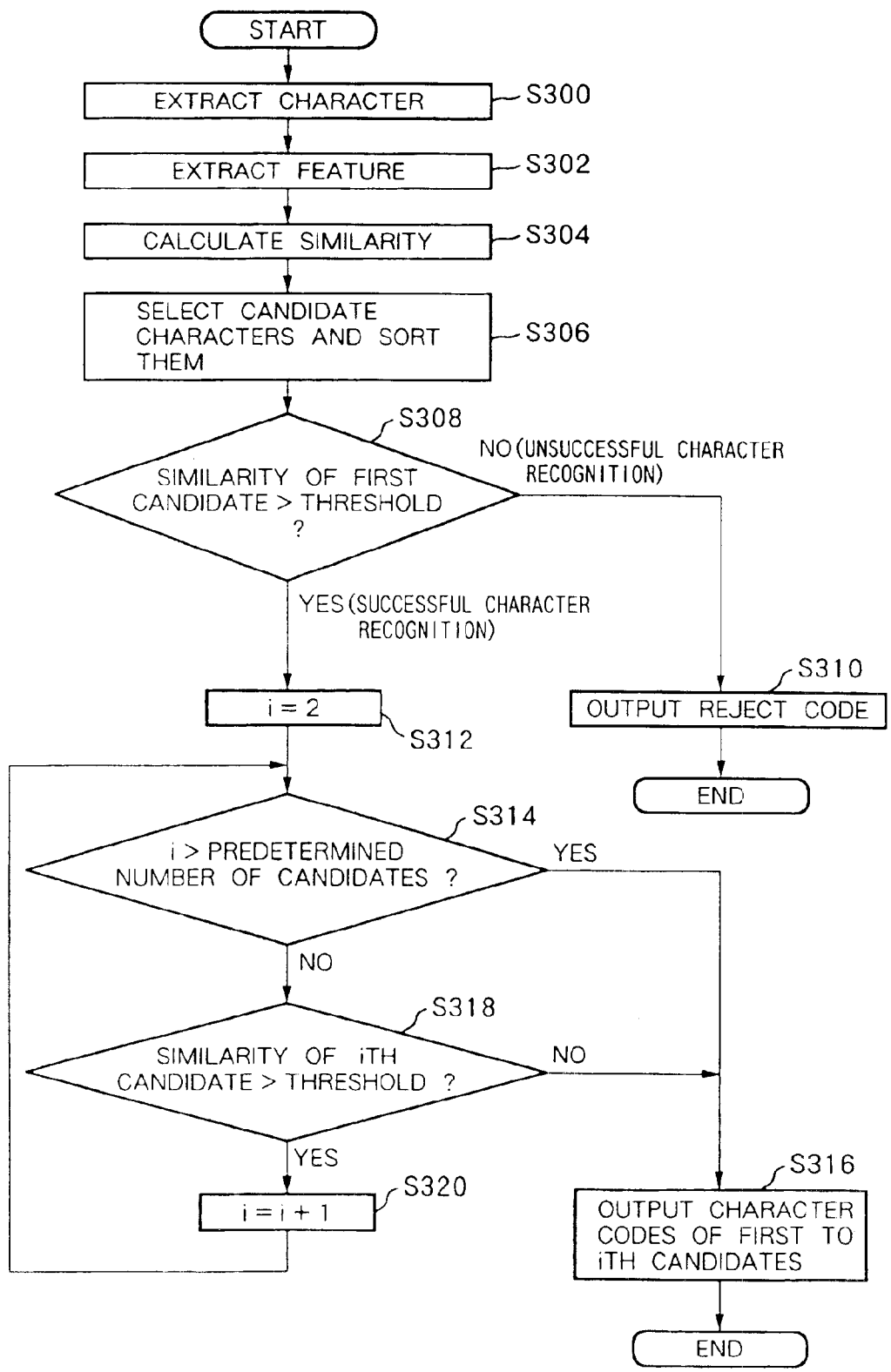
FIG. 2 is a flow chart showing processing executed in a character recognition block of the first embodiment according to the present invention.

FIG. 2 is a flow chart showing the processing executed in the character recognition block of a first embodiment according to the present invention.

First, at step S300, the character recognition block 106 in the mobile terminal 100 performs character extraction that characters are separated from the image signal inputted from the scanner 104. At step S302, the character recognition block 106 performs predetermined feature extraction from the character image signal separated at the step S300. At step S304, the block 106 calculates the similarity of the image signal of the recognition object character to learned characters in the recognition dictionary 106a on the basis of the feature extracted at the step S302. At step S306, the block 106 selects the predetermined number of recognition candidate characters in the order of their amount, and sorts the recognition candidate characters. Furthermore, this number of recognition candidate characters is set in a number-of-recognition-candidate-characters register (not shown).

At step S308, the block 106 compares the similarity of the first candidate of the recognition candidate characters, that is, the recognition candidate character having the largest similarity, with the threshold for judgement of unrecognizableness with using the unrecognizableness judging block 106b. If the similarity of the first candidate is less than the threshold for judgement of unrecognizableness (NO at the step S308), the process goes to step S310, where a predetermined identifier, that is, a rejection code is outputted with judging the recognition object character as an unrecognizable character. On the other hand, if the similarity of the first candidate is larger than the threshold for judgement of unrecognizableness (YES at the step S308), the process goes to step S312 as successful recognition since it is possible to output at least one result of character recognition.

At the step S312, two is substituted to a number-of-recognition-candidate-characters counter i (not shown) counting the number of the recognition candidate characters processed. At step S314, it is judged whether the content of the number-of-recognition-candidate-characters counter i exceeds the number of recognition candidate characters set in the number-of-recognition-candidate-characters register. If the content of the number-of-recognition-candidate-characters counter i exceeds the number of recognition candidate characters (YES at step S314), the subsequent processing is stopped since there is no recognition candidate character over the number. Then, the process goes to step S316. In addition, at the step S316, all the character codes corresponding to the recognition candidate characters having similarity exceeding the threshold for judgement of unrecognizableness are outputted. On the other hand, if the content of the number-of-recognition-candidate-characters counter i does not exceed the number of recognition candidate characters (NO at the step S314), the process goes to step S318.

At the step S318, the similarity of the ith candidate is compared with the threshold for judgement of unrecognizableness. If the similarity of the ith candidate is less than the threshold for judgement of unrecognizableness (NO at the step S318), the ith candidate and subsequent candidates are judged as unrecognizable characters. Then, the process goes to the step S316. On the other hand, if the similarity of the ith candidate is larger than the threshold for judgement of unrecognizableness (YES at the step S318), the process goes to step S320, where the number-of-recognition-candidate-characters counter i is incremented and the process returns to the step S314.

In addition, the number-of-recognition-candidate-characters register and number-of-recognition-candidate-characters counter are implemented, for example, in the RAM mounted in the central control unit 200, or are constructed with dedicated hardware.

Figure 17:
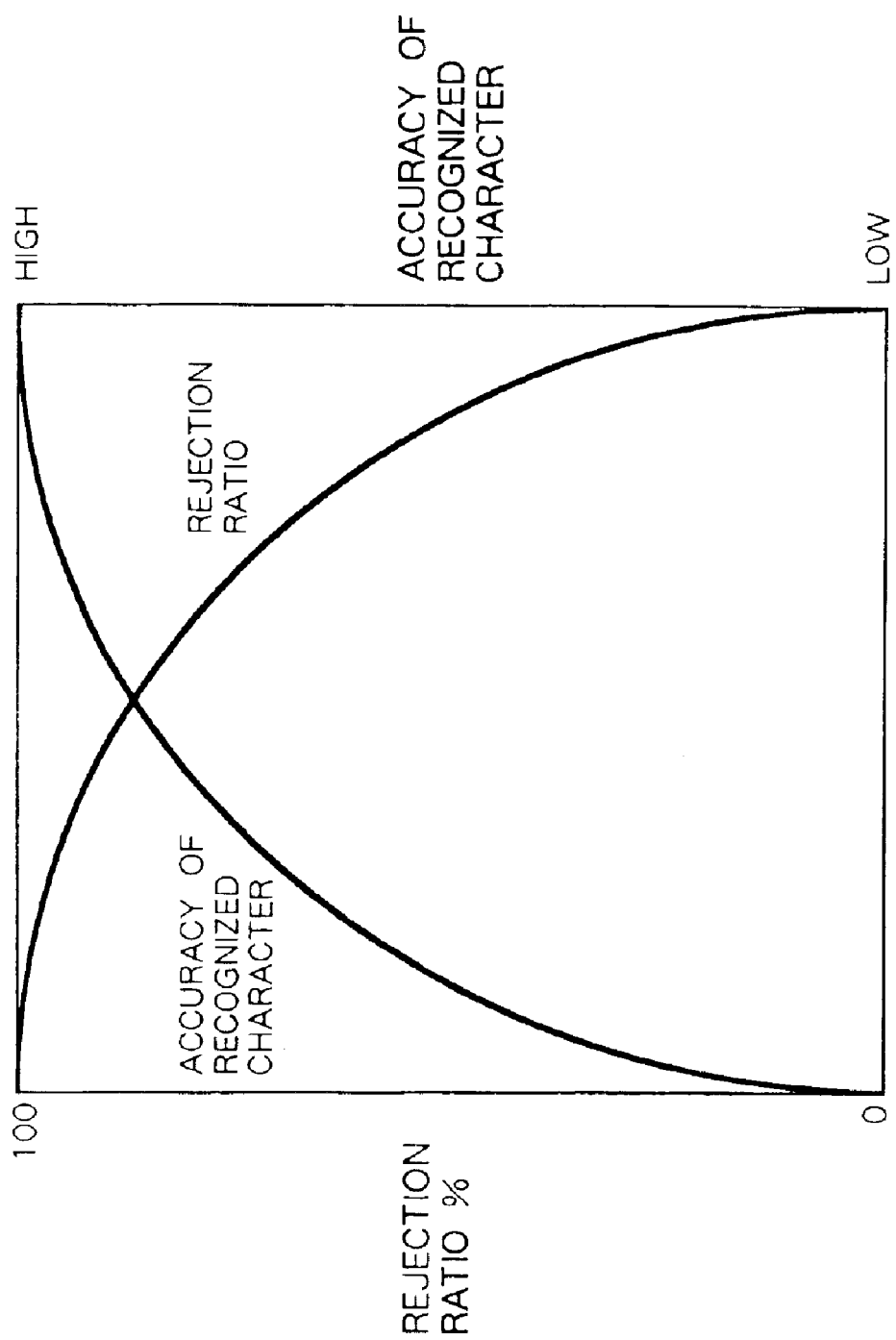
FIG. 17 is a graph showing the relationship between the rejection ratio and accuracy of recognized character.

Owing to above processing, the rejection ratio judged has the tendency shown in FIG. 17. Thus, if the rejection ratio is high, the correct solution ratio of characters judged as recognizable characters increase, but their number is few. On the contrary, if the rejection ratio is low, the number of characters judged as recognizable characters is large, but the correct solution ratio of the characters also decreases. Then, in the first embodiment, in order that character recognition in the mobile terminal 100 may be executed at an optimum rejection ratio, the threshold controller 104 of the central control unit 200 resets the threshold for judgement of unrecognizableness according to a judgement state of the unrecognizableness judging block 106b of the mobile terminal 100.

Figure 3:
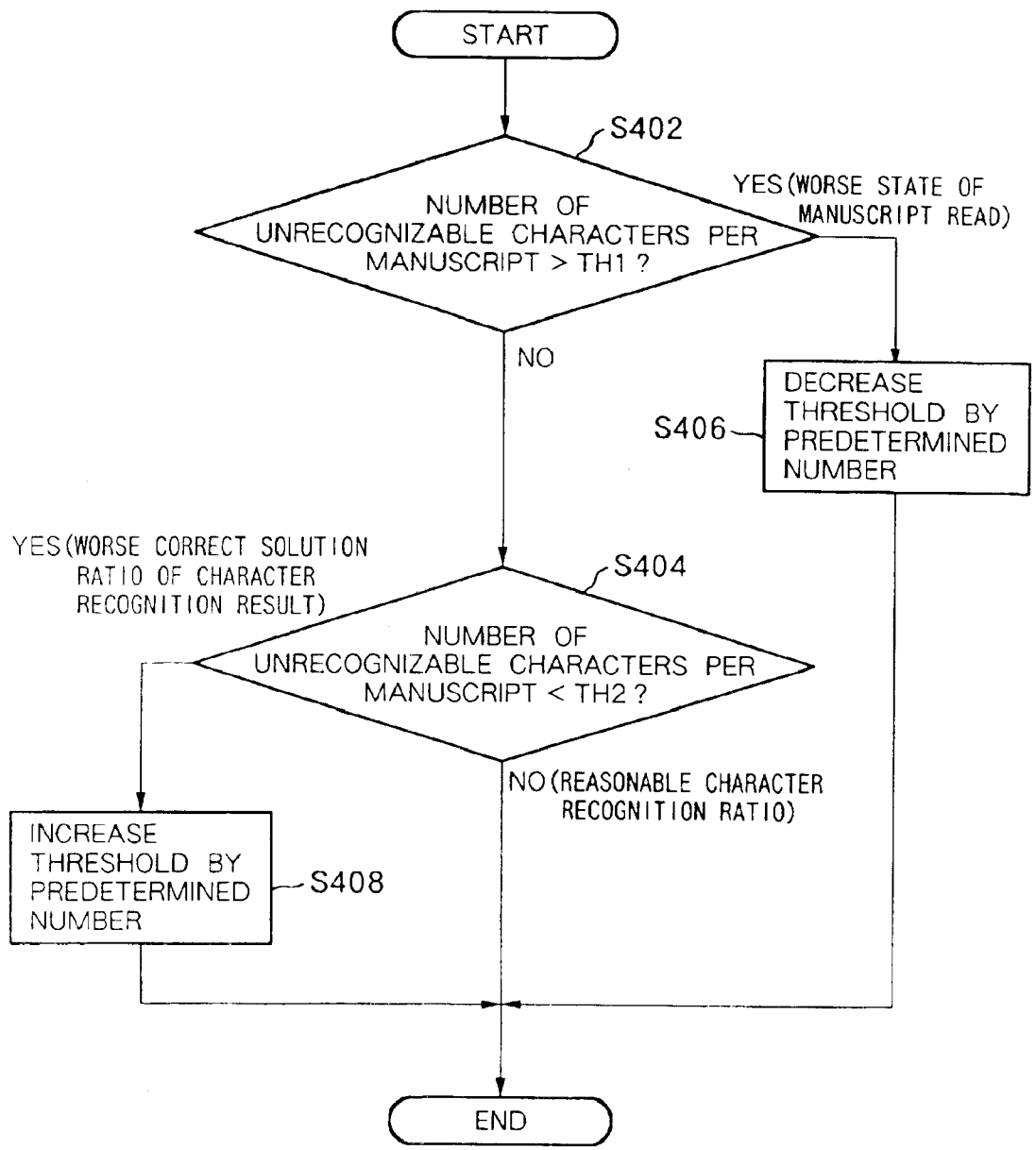
FIG. 3 is a flow chart showing processing executed in a threshold controller of the first embodiment according to the present invention.

FIG. 3 is a flow chart showing the processing executed in the threshold controller of the first embodiment of the present invention.

At step S402, on the basis of the result of character recognition received by the character recognition result receiver 202, it is judged whether the number of unrecognizable characters (rejection codes) per read manuscript is not less than the first threshold TH1. If the number of unrecognizable characters is not less than the first threshold TH1 (YES at the step S402), the controller 104 judges that the read condition of the read manuscript on the scanner 104 of the mobile terminal 100 becomes worse due to some reason. Then, the process goes to step S406. In addition, at the step S406, so as to increase the number of recognizable characters, the controller 104 resets the threshold for judgement of unrecognizableness to a value less than the current threshold for judgement of unrecognizableness that is set in the unrecognizableness judging block 106b of the mobile terminal 100. After that, the process is ended.

On the other hand, if the number of unrecognizable characters is less than the first threshold TH1 (NO at the step S402), the process goes to step S404. At the step S404, it is judged whether the number of unrecognizable characters is less than the second threshold TH2 (<TH1). If the number of unrecognizable characters is less than the second threshold TH2 (YES at the step S404), the controller 104 judges that the correct solution ratio of the result of character recognition becomes worse, and the process goes to step S408. Then, at the step S408, so as to increase the correct solution ratio of recognition results, the controller 104 resets the threshold for judgement of unrecognizableness to a value that is larger than the current threshold for judgement of unrecognizableness that is set in the unrecognizableness judging block 106b of the mobile terminal 100. After that, the process is ended.

On the other hand, if the number of unrecognizable characters is not less than the second threshold TH2 (NO at the step S404), the controller 104 judges that the current threshold for judgement of unrecognizableness is adequate, and ends the processing.

As described above, according to the first embodiment, it is possible to always obtain the result of character recognition having the optimum accuracy by an operator judging the character recognition state of each mobile terminal 100 in the central control unit 200 and adaptively controlling the threshold for judgement of unrecognizableness used for re-judgement in the unrecognizableness judging block 106b of the mobile terminal 100. In particular, in case that the recognition state in the mobile terminal 100 side changes every moment, the present invention can largely contribute to making the character recognition processing of the mobile terminal 100 efficient.

Although, in the first embodiment, the number of recognition candidate characters that the character recognition block 106 of the mobile terminal 100 outputs is plural, the present invention is not limited to this. For example, with selecting a recognition candidate character having the largest similarity as only one recognition candidate character, the unrecognizableness judging block 106b can perform judgement. In this case, it becomes possible to accelerate the processing.

Although, in the first embodiment, the communication system composed of the mobile terminal 100 and central control unit 200 that are connected via the wireless network 300 is described, the present invention is not limited to this. For example, there is no problem even if a communication system is composed of terminals and a central control unit 200 that are connected via a wired network, internet, intranet, and etc.

<Embodiment 2>

Figure 4:
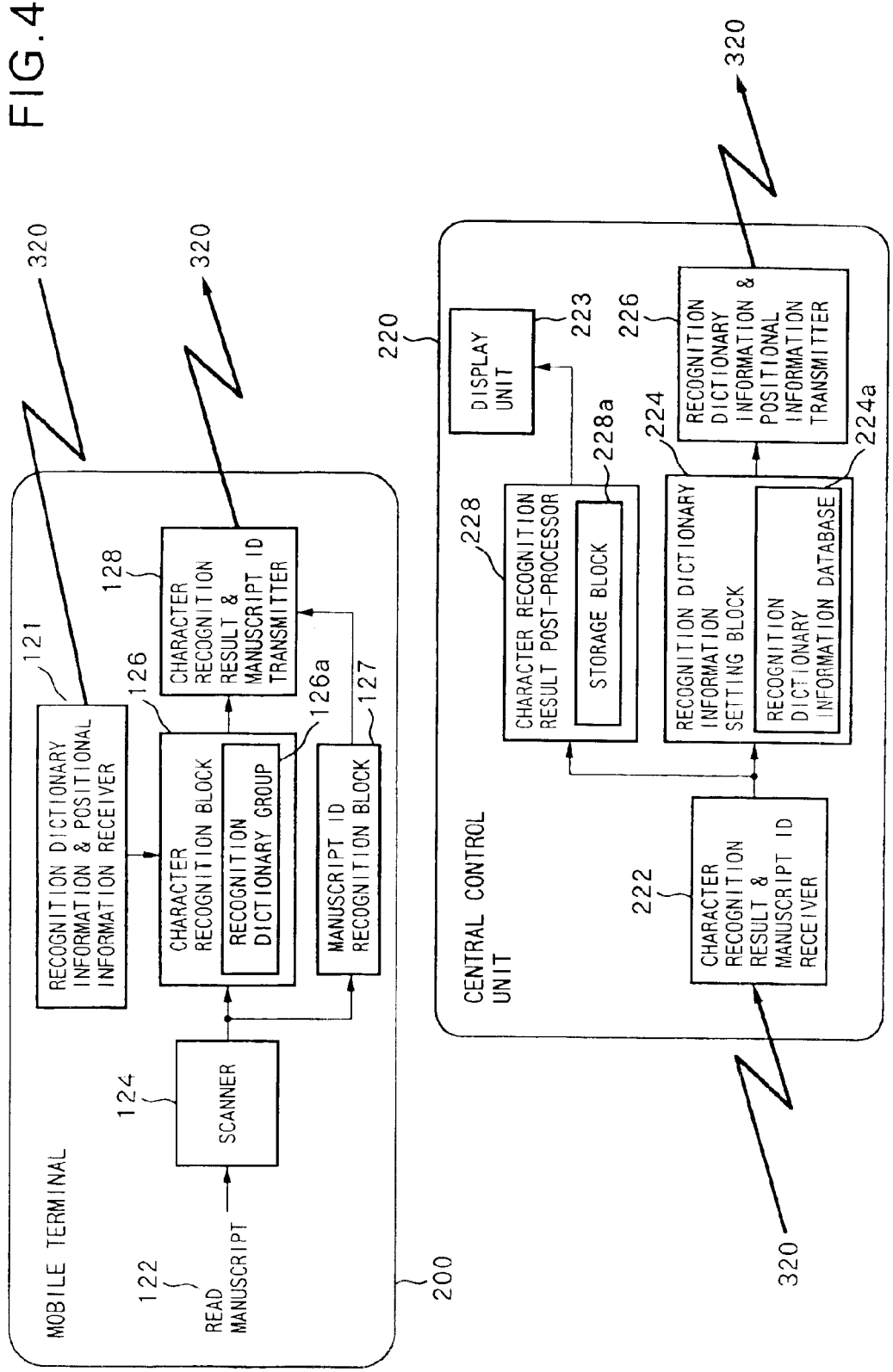
FIG. 4 is a block diagram showing the construction of a communication system of a second embodiment according to the present invention.

FIG. 4 is a block diagram showing the construction of a communication system of a second embodiment according to the present invention.

As shown in FIG. 4, the communication system is composed of a mobile terminal 120 and a central control unit 220. In addition, the mobile terminal 120 and central control unit 220 are connected via a wireless network 320. Furthermore, here, one mobile terminal 120 and one central control unit 220 constructs the communication system, but the second embodiment can be also applied to a case of a communication system comprising a plurality of mobile terminals 120. Moreover, in case each mobile terminal of the plurality of mobile terminals 120 communicates with the central control unit 220, the central control unit 220 can identify each mobile terminal by starting communication, for example, after each mobile terminal issuing an identification signal different from others to the central control unit 220.

In a mobile terminal 120, symbol 122 shows a read manuscript. In addition, for example, a manuscript ID showing recognition position information of recognition areas that are classified every character font constructed in the read manuscript is added to the read manuscript 122. Symbol 124 shows a scanner reading the read manuscript 122 and generating an image signal including the manuscript ID. Symbol 126 shows a character recognition block performing character recognition every recognition area of the image signal generated in the scanner 124 with selecting a recognition dictionary, which is shown by recognition dictionary information, from a recognition dictionary group 126a on the basis of the recognition dictionary information and positional information that is received by a recognition dictionary information & positional information receiver 121. Symbol 127 shows a manuscript ID recognition block recognizing a manuscript ID in the image signal generated. Symbol 128 shows a character recognition result & manuscript ID transmitter transmitting the result of character recognition by the character recognition block 126 and the result of manuscript ID recognition by the manuscript ID recognition block 127 to the central control unit 220. Symbol 121 shows the recognition dictionary information & positional information receiver receiving the positional information showing a recognition area of the image signal and the recognition dictionary information showing a recognition dictionary used for recognition of the recognition area from the central control unit 220.

In the central control unit 220, symbol 222 shows a character recognition result & manuscript ID receiver receiving the result of character recognition and the result of manuscript ID recognition from the mobile terminal 120. Symbol 228 is a character recognition result post-processor performing post-processing of the result of character recognition received by the character recognition result & manuscript ID receiver 222. Symbol 228a shows a storage block storing data such as processing-result by the character recognition result post-processor 228. Symbol 223 shows a display unit displaying processing-result by the character recognition result post-processor 228. Symbol 224 shows a recognition dictionary setting block setting the recognition dictionary information, showing a recognition dictionary for each recognition area in the image signal of a recognition object, from the result of manuscript ID recognition received by the character recognition result & manuscript ID receiver 222 with referring to a recognition dictionary information database 224a. The symbol 224a shows the recognition dictionary information database managing recognition dictionary information, showing a recognition dictionary optimum for recognition of the recognition area, every image signal shown by the manuscript ID. Symbol 226 shows a recognition dictionary information & positional information transmitter transmitting positional information and recognition dictionary information of each recognition area in the image signal, which is set in the recognition dictionary setting block 224, to the mobile terminal 120.

In addition, in each of the mobile terminal 120 and central control unit 220, a CPU, RAM, and ROM, which are not shown, are mounted. A CPU mounted in each terminal executes various programs after developing the various programs that are stored in the ROM and is used for controlling equipment. In addition, the RAM also functions as a working area and a temporary save area.

Next, the operation of the communication system of the second embodiment will be described with reference to FIG. 4.

From the read manuscript 122 prepared in the mobile terminal 120, an image signal including a manuscript ID corresponding to the read manuscript 122 is generated by the scanner 124. The image signal is sent to the character recognition block 126, where character recognition is performed. The recognition dictionary information & positional information receiver 121 receives positional information and recognition dictionary information of each recognition area in the image signal of a recognition object, which is set in the recognition dictionary information setting block 224 of the central control unit 220, via the wireless network 320. Here, the character recognition block 126 compares similarity of recognition candidate characters in each recognition area with using a recognition dictionary shown by the recognition dictionary information for each recognition area in the image signal received by the recognition dictionary information & positional information receiver 121. Then, on the basis of the comparison result, the character recognition block 126 outputs a recognition result. In addition, detailed processing executed in the character recognition block 126 will be described later. The character recognition result & manuscript ID transmitter 128 transmits a character code, which is the result of character recognition by the character recognition block 126, and the result of manuscript ID recognition by the manuscript ID recognition block 127, to the central control unit 220 via the wireless network 320.

On the other hand, in the central control unit 220, first, the character recognition result & manuscript ID receiver 222 receives the result of character recognition and the result of manuscript ID recognition that are transmitted from the mobile terminal 120. The result of character recognition received is corrected by the character recognition result post-processor 228, is stored by the storage block 228a, and is processed like searching data, stored in the storage block 228a, with using the result of character recognition as a key. The processing-result is displayed on the display unit 223. The recognition dictionary information setting block 224 sets recognition dictionary information, showing a recognition dictionary optimum for each recognition area in the image signal of the recognition object, on the basis of the result of manuscript ID recognition which is received, with referring to the recognition dictionary information database 224a. Furthermore, the positional information every recognition area is also obtained. In addition, the processing executed in the recognition dictionary information setting block 224 will be described later in detail. The recognition dictionary information and positional information of each recognition area in the image signal of the recognition object, which is set in the recognition dictionary information setting block 224 is transmitted to the mobile terminal 120 by the recognition dictionary information & positional information transmitter 226 via the wireless network 320.

Next, the processing executed in the second embodiment will be described with reference to FIGS. 5 and 6. In addition, here, in particular, the processing executed in the character recognition block 126 and recognition dictionary information setting block 224 that are important parts of the present invention will be described in detail.

Figure 5:
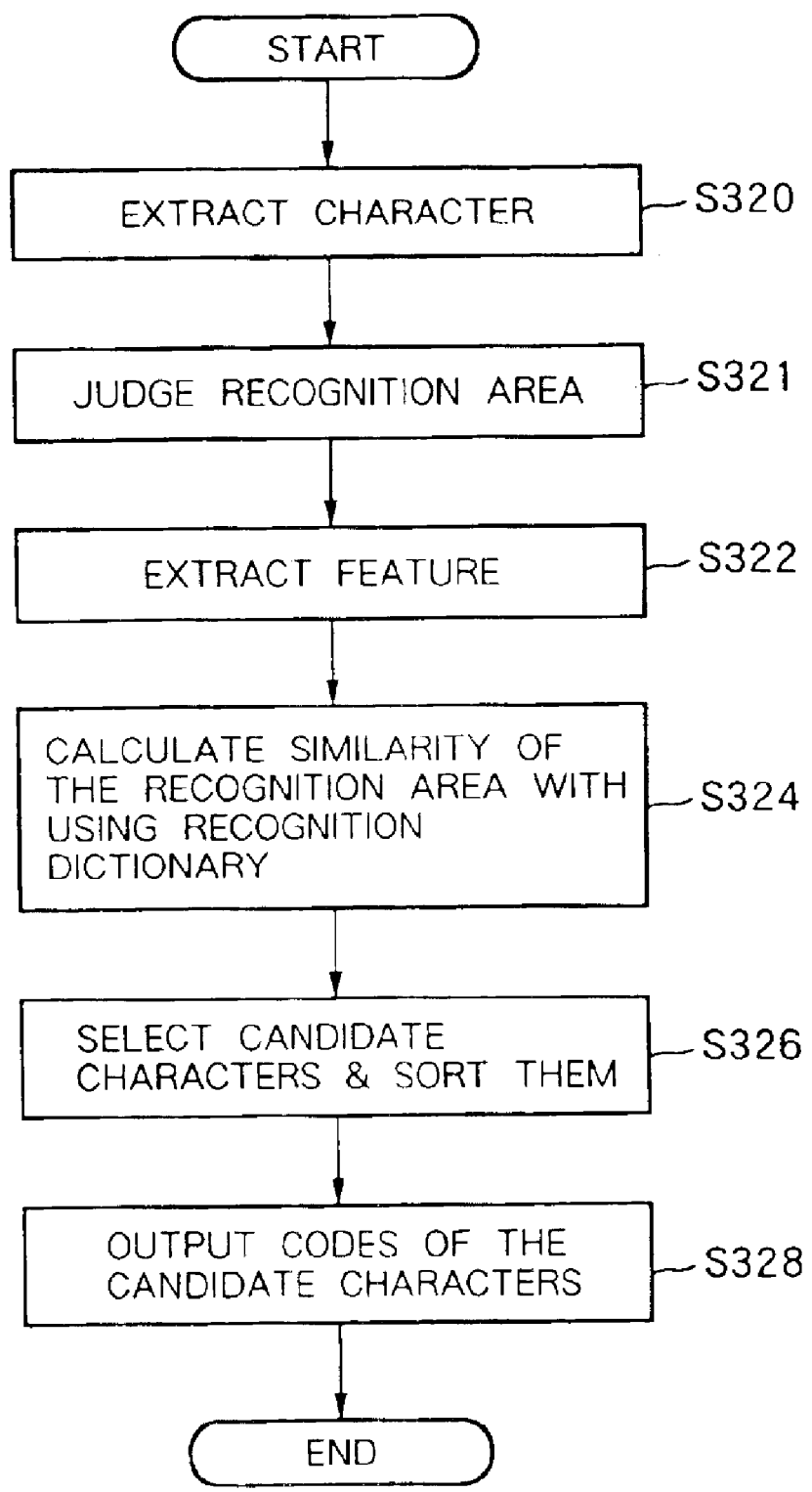
FIG. 5 is a flow chart showing processing executed in a character recognition block of the second embodiment according to the present invention.

FIG. 5 is a flow chart showing the processing executed in the character recognition block of a second embodiment according to the present invention.

First, at step S320, the character recognition block 126 performs character extraction that characters are separated from the image signal inputted from the scanner 124. At step S321, the manuscript ID recognition block 127 recognizes a manuscript ID included in the image signal inputted. Then, the manuscript ID recognition block 127 judges on the basis of the manuscript ID, which is recognized, a recognition area where the character that is extracted at the step S320 belongs among the recognition areas of the image signal. At step S322, the character recognition block 126 performs predetermined feature extraction from the character extracted at the step S320. At step S324, the block 126 calculates the similarity of the recognition object character to learned characters in the recognition dictionary 126a every recognition area on the basis of the feature extracted at the step S322. At step S326, the block 126 selects the predetermined number of recognition candidate characters in the order of their amount, and sorts the recognition candidate characters. At step S328, all the character codes corresponding to recognition candidate characters are outputted.

Figure 6:
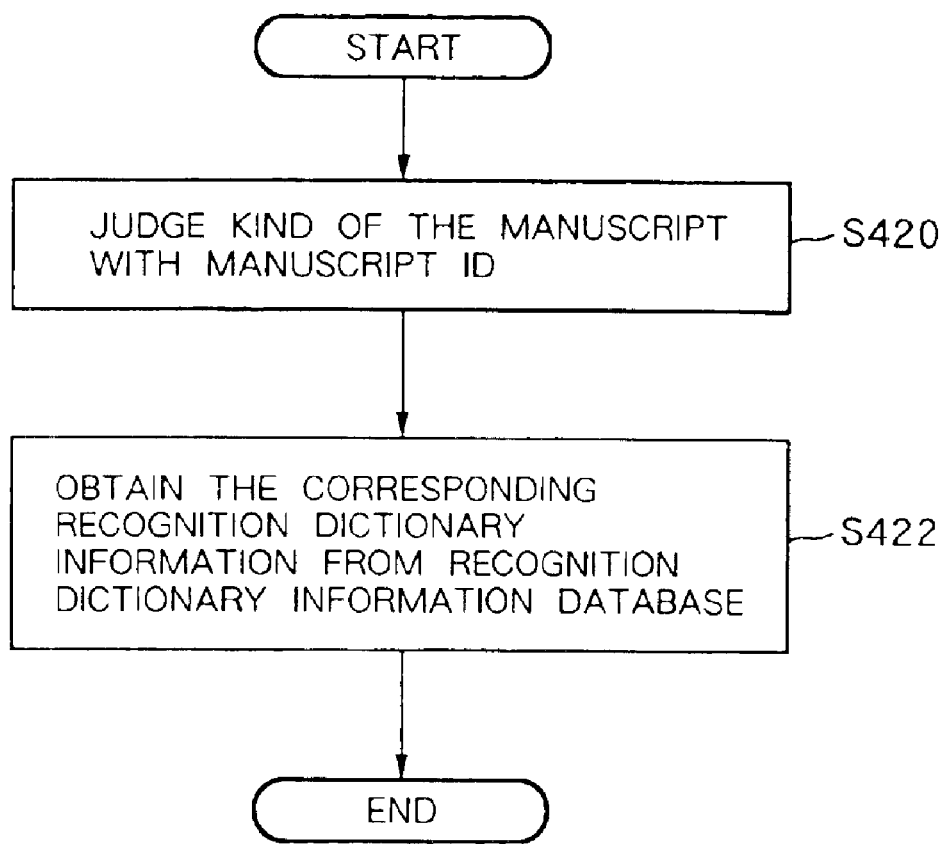
FIG. 6 is a flow chart showing processing executed in a recognition dictionary information setting block of the second embodiment according to the present invention.

FIG. 6 is a flow chart showing the processing executed in the recognition dictionary information setting block of the second embodiment of the present invention.

At step 420, the manuscript ID of the image signal of the recognition object is judged according to the result of manuscript ID recognition received in the character recognition result & manuscript ID receiver 222. At step S422, data (recognition dictionary information and positional information of each recognition area of the image signal of the recognition object) corresponding to the manuscript ID judged at the step S420 is obtained from the recognition dictionary information database 224a.

As described above, according to the second embodiment, it is possible to increase recognition accuracy in each recognition area. This is because the central control unit 220 can set a recognition dictionary optimum for each recognition area of the image signal inputted in the mobile terminal 120, on the basis of the result of manuscript ID recognition inputted from the mobile terminal 120. In particular, in case that characters whose writers are different or different fonts are mixed, or a format of a read manuscript changes in the same read manuscript, the present invention can perform excellently accurate character recognition of the read manuscript, and can largely increase the efficiency of processing.

Although, in the second embodiment, the communication system composed of the mobile terminal 120 and central control unit 220 that are connected via the wireless network 320 is described, the second embodiment is not limited to this. For example, there is no problem even if a communication system is composed of terminals and a central control unit 220 that are connected via a wired network, internet, intranet and etc.

<Embodiment 3>

A third embodiment is a modified example of the first embodiment. The construction different from that of the first embodiment is new provision of a threshold input block 234, which enables a user to input an optional threshold, instead of the threshold controller 204.

Figure 7:
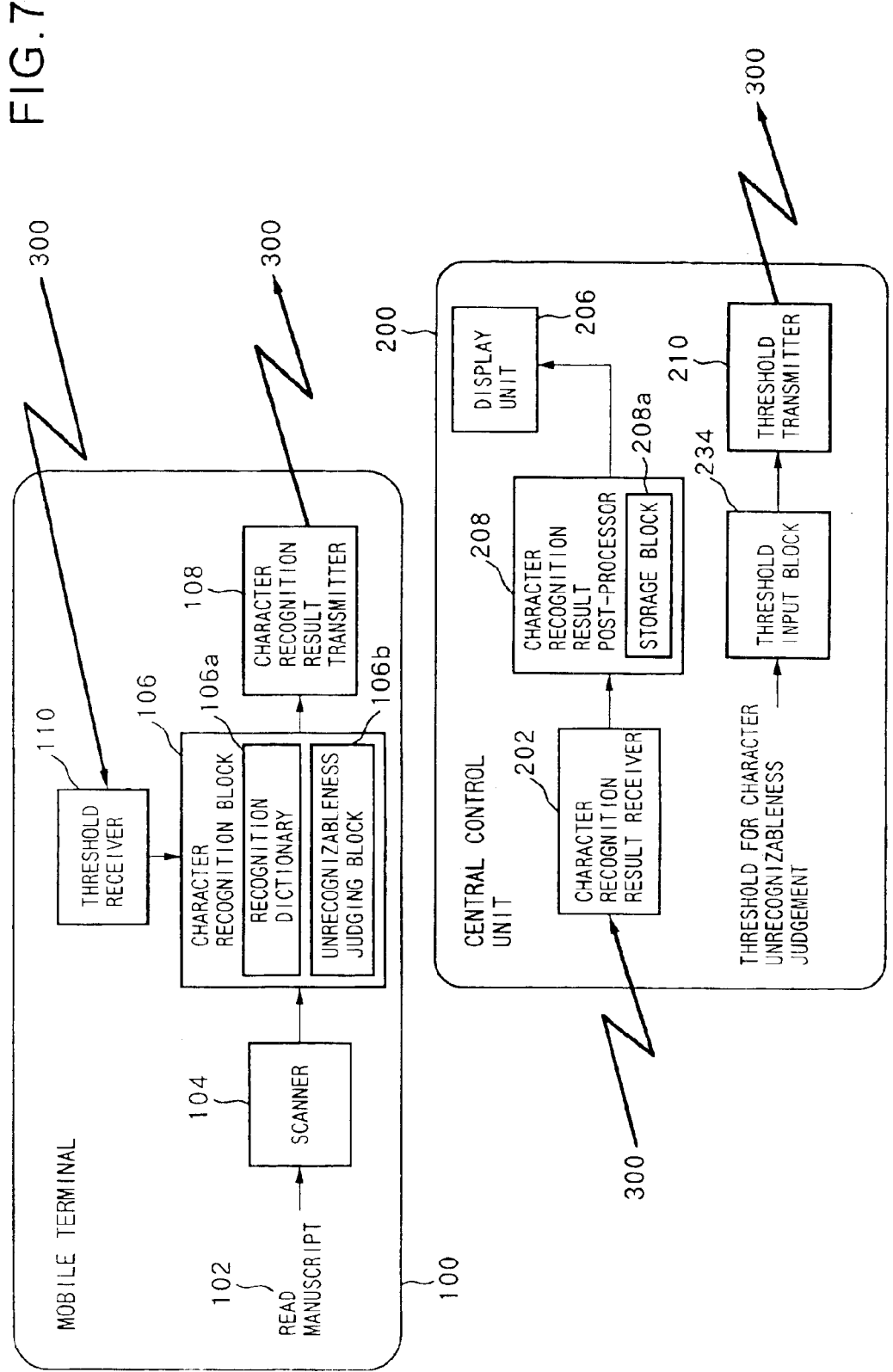
FIG. 7 is a block diagram showing the construction of a communication system of a third embodiment according to the present invention.

FIG. 7 is a block diagram showing the construction of a communication system of the third embodiment according to the present invention.

Symbol 234 shows the threshold input block inputting a threshold for judgement of unrecognizableness. In the threshold input block 234, an operator determines an optimum threshold for judgement of unrecognizableness on the basis of the processing result obtained by the character recognition result post-processor 208, and inputs the optimum threshold. In addition, the processing executed in the threshold input block 234 will be described later in detail. The threshold for judgement of unrecognizableness that is inputted from the threshold input block 234 is transmitted to the mobile terminal 100 by the threshold transmitter 210 via the wireless network 300.

Next, as the processing executed in the third embodiment, the processing similar to that of the first embodiment in FIG. 2 is executed. Then, owing to the processing described in FIG. 2, the rejection ratio judged has the tendency shown in FIG. 17. Thus, if the rejection ratio is high, the correct solution ratio of characters judged as recognizable characters increase, but their number is few. On the contrary, if the rejection ratio is low, the number of characters judged as recognizable characters is many, but the correct solution ratio of the characters also decreases. Then, in the third embodiment, in order that character recognition in the mobile terminal 100 may be executed at an optimum rejection ratio, the threshold input block 234 of the central control unit 200 resets the threshold for judgement of unrecognizableness according to a judgement state of the unrecognizableness judging block 106b of the mobile terminal 100.

Concretely, the threshold for judgement of unrecognizableness in the unrecognizableness judging block 106b of the mobile terminal 100 is changed from the threshold input block 234 of the central control unit 200.

Thus, an operator in the central control unit 200 judges that the accuracy of the result of character recognition transmitted from the mobile terminal 100 is hard or it is necessary to reduce the character recognition accuracy a little bit if, for example, the operator judges that the number of unrecognizable characters per read manuscript in a mobile terminal 100 is extremely many. Then, the operator inputs a threshold for judgement of unrecognizableness, which is lower than the current threshold for judgement of unrecognizableness, from the threshold input block 234. Furthermore, the threshold transmitter 210 transmits the threshold for judgement of unrecognizableness to the corresponding mobile terminal 100, and the operator controls this system so as to be able to receive further plenty of normal recognition results. On the other hand, if the operator judges that the number of unrecognizable characters per read manuscript is few, the operator judges that the accuracy of the result of character recognition transmitted from the mobile terminal 100 becomes worse or there is a space for further increasing the character recognition accuracy. Then, the operator inputs a threshold for judgement of unrecognizableness, which is higher than the current threshold for judgement of unrecognizableness, from the threshold input block 234. Furthermore, the threshold transmitter 210 transmits the threshold for judgement of unrecognizableness to the corresponding mobile terminal 100.

As described above, according to the third embodiment, it becomes possible to always obtain the result of character recognition having desired accuracy. This is because, in the central control unit 200, an operator judges the result of character recognition in each mobile terminal 100 and inputs a threshold for judgement of unrecognizableness that is used for judgement in the unrecognizableness judging block 106b of the mobile terminal 100. In particular, in case that the recognition state in the mobile terminal 100 changes every moment, the present invention can largely contribute to making the character recognition processing of the mobile terminal 100 efficient.

Although, in the third embodiment, the number of recognition candidate characters that the character recognition block 106 of the mobile terminal 100 outputs is plural, the present invention is not limited to this. For example, with selecting a recognition candidate character having the largest similarity as only one recognition candidate character, the unrecognizableness judging block 106b can perform judgement. In this case, it becomes possible to accelerate the processing.

Although, in the third embodiment, the communication system composed of the mobile terminal 100 and central control unit 200 that are connected via the wireless network 300 is described, the third embodiment is not limited to this. For example, there is no problem even if a communication system is composed of terminals and a central control unit 200 that are connected via a wired network, internet, intranet and etc.

<Embodiment 4>

Figure 8:
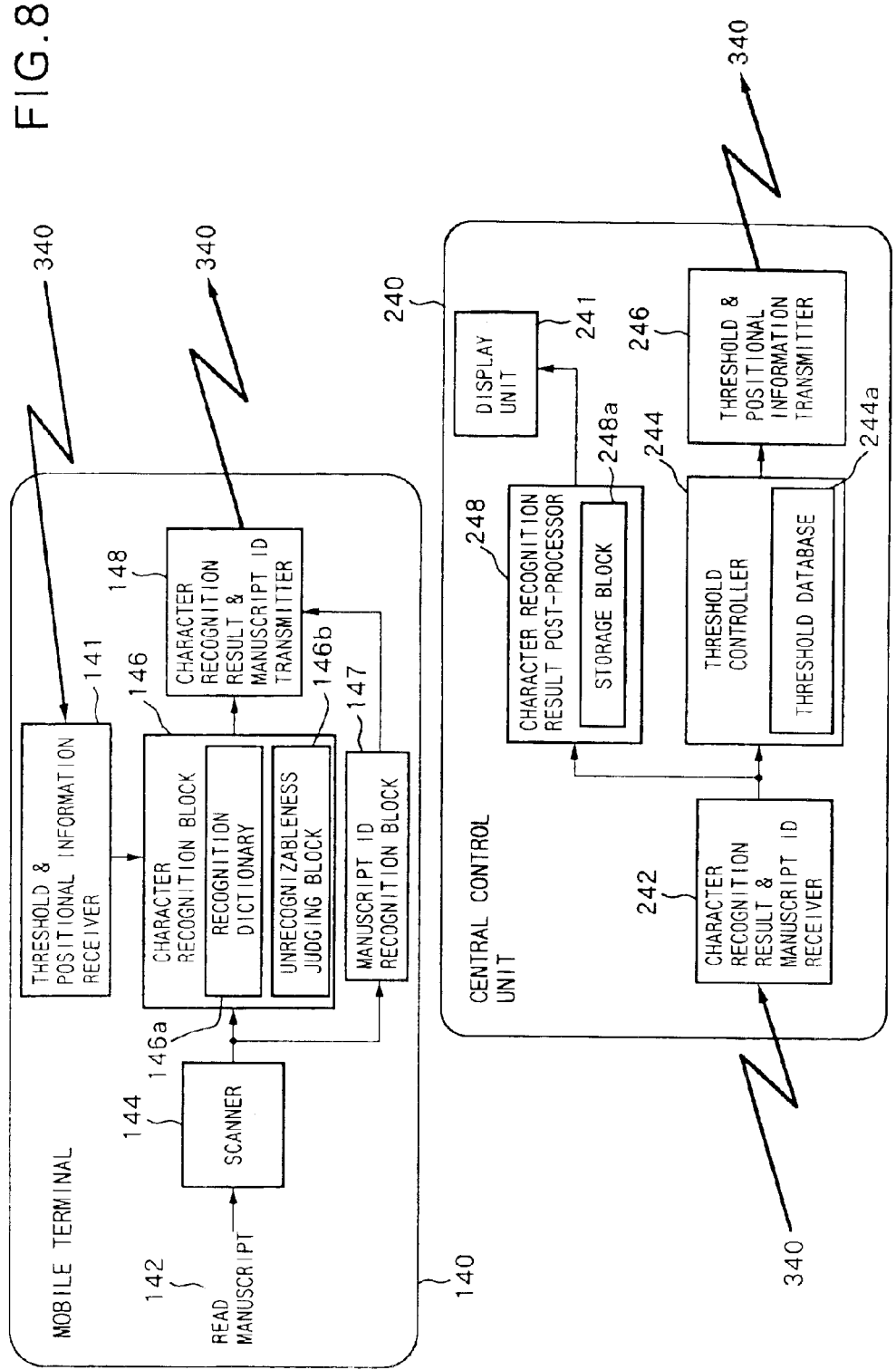
FIG. 8 is a block diagram showing the construction of a communication system of a fourth embodiment according to the present invention.

FIG. 8 is a block diagram showing the construction of a communication system of a fourth embodiment according to the present invention.

As shown in FIG. 8, the communication system is composed of a mobile terminal 140 and a central control unit 240. In addition, the mobile terminal 140 and central control unit 240 are connected via a wireless network 340. Furthermore, here, one mobile terminal 140 and one central control unit 240 constructs the communication system, but the fourth embodiment can be also applied to a case of a communication system comprising a plurality of mobile terminals 140. Moreover, in case each mobile terminal among the plurality of mobile terminals 140 communicates with the central control unit 240, the central control unit 240 can identify each mobile terminal by starting communication, for example, after each mobile terminal issuing an identification signal different from others to the central control unit 240.

In a mobile terminal 140, symbol 142 shows a read manuscript. In addition, for example, a manuscript ID showing recognition position information of recognition areas that are classified every character font constructed in the read manuscript is added to the read manuscript 142. Symbol 144 shows a scanner reading the read manuscript 142 and generating an image signal including the manuscript ID. Symbol 146 shows a character recognition block performing character recognition of the image signal generated in the scanner 144 with using a recognition dictionary 146a. Symbol 146b shows a unrecognizableness judging block judging whether a recognition candidate character outputted by the character recognition block 146 is unrecognizable, on the basis of a threshold for judgement of unrecognizableness. Symbol 147 shows a manuscript ID recognition block recognizing a manuscript ID in the image signal generated. Symbol 148 shows a character recognition result & manuscript ID transmitter transmitting the result of character recognition by the character recognition block 146 and the result of manuscript ID recognition by the manuscript ID recognition block 147 to the central control unit 240. Symbol 141 shows the threshold & positional information receiver receiving the positional information showing a recognition area of the image signal and a threshold for judgement of unrecognizableness in the recognition area from the central control unit 240.

In the central control unit 240, symbol 242 shows a character recognition result & manuscript ID receiver receiving the result of character recognition and the result of manuscript ID recognition from the mobile terminal 140. Symbol 248 is a character recognition result post-processor performing post-processing of the result of character recognition received by the character recognition result & manuscript ID receiver 242. Symbol 248a shows a storage block storing data such as processing-result by the character recognition result post-processor 248. Symbol 241 shows a display unit displaying processing-result by the character recognition result post-processor 248. Symbol 244 shows a threshold controller setting a threshold for judgement of unrecognizableness in each recognition area in the image signal of the recognition object from the result of manuscript ID recognition received by the character recognition result receiver 242 with referring to a threshold database 244a. The symbol 244a shows the threshold database managing an optimum threshold for judgement of unrecognizableness in a recognition area of each image signal every image signal shown by the manuscript ID every read manuscript. Symbol 246 shows a threshold & positional information transmitter transmitting positional information of each recognition area in the image signal, which is set in the threshold controller 244, and a threshold for judgement of unrecognizableness of each recognition area to the mobile terminal 140.

In addition, in each of the mobile terminal 140 and central control unit 240, a CPU, RAM, and ROM, which are not shown, are mounted. A CPU mounted in each terminal executes various programs after developing the various programs which are stored in the ROM and is used for controlling equipment. In addition, the RAM also functions as a working area and a temporary save area.

Next, the operation of the communication system of the fourth embodiment will be described with reference to FIG. 8.

From the read manuscript 142 prepared in the mobile terminal 140, an image signal including a manuscript ID corresponding to the read manuscript 142 is generated by the scanner 144. The image signal is sent to the character recognition block 146, where character recognition is performed. The threshold & positional information receiver 141 receives positional information of each recognition area in the image signal of a recognition object and the threshold for judgement of unrecognizableness, which are set in the threshold controller 244 of the central control unit 240, via the wireless network 340. Here, character recognition block 146 compares a threshold for judgement of unrecognizableness in each recognition area of the image signal received by the threshold & positional information receiver 141 and the similarity of the recognition candidate character in each recognition area. As a result of comparison, if the similarity of the recognition candidate character is larger than the threshold for judgement of unrecognizableness, the block 146 outputs a character code corresponding to the recognition candidate character as the recognition result. On the other hand, if the similarity of the recognition candidate character is less than the threshold for judgement of unrecognizableness, the block 146 outputs a predetermined rejection code as an unrecognizable character. In addition, processing executed in the character recognition block 146 will be described later in detail. The character recognition result & manuscript ID transmitter 148 transmits a character code, which is the result of character recognition by the character recognition block 146, and a rejection code, which shows unrecognizableness, and the result of manuscript ID recognition by the manuscript ID recognition block 147, to the central control unit 240 via the wireless network 340.

On the other hand, in the central control unit 240, first, the character recognition result & manuscript ID receiver 242 receives the result of character recognition and the result of manuscript ID recognition that are transmitted from the mobile terminal 140. The result of character recognition received is corrected by the character recognition result post-processor 248, is stored by the storage block 248a, and is processed like searching data, stored in the storage block 248a, with using the result of character recognition as a key. The processing-result is displayed on the display unit 241. The threshold controller 244 sets a threshold for judgement of unrecognizableness that is optimum for each recognition area in the image signal of the recognition object, on the basis of the result of manuscript ID recognition which is received, with referring to the threshold database 244a. Furthermore, the positional information every recognition area is also obtained. In addition, detail of the processing executed in the threshold controller 244 will be described later. The threshold for judgement of unrecognizableness and positional information of each recognition area in the image signal of the recognition object, which is set in the threshold controller 244, is transmitted to the mobile terminal 140 by the threshold & positional information transmitter 246 via the wireless network 340.

Next, the processing executed in the fourth embodiment will be described with reference to FIGS. 9 and 10. In addition, here, in particular, the processing executed in the character recognition block 146 and threshold controller 244 that are important parts of the fourth embodiment will be described in detail.

Figure 9:
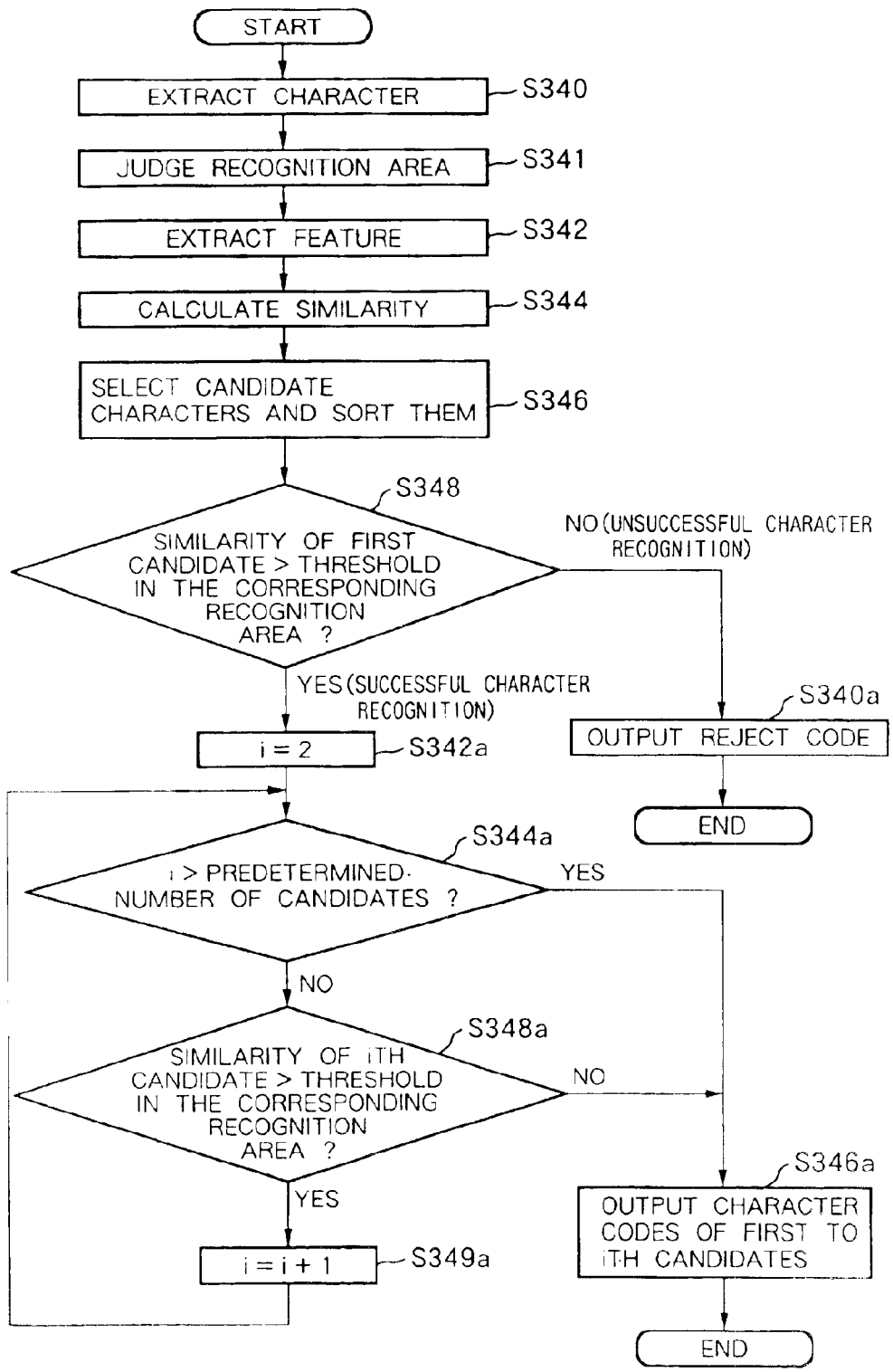
FIG. 9 is a flow chart showing processing executed in a character recognition block of the fourth embodiment according to the present invention.

FIG. 9 is a flow chart showing the processing executed in the character recognition block of a fourth embodiment according to the present invention.

First, at step S340, the character recognition block 146 performs character extraction in which characters are separated from the image signal inputted from the scanner 144. At step S341, the manuscript ID recognition block 147 recognizes a manuscript ID included in the image signal inputted. Then, the manuscript ID recognition block 147 judges on the basis of the manuscript ID, which is recognized, a recognition area where the character that is extracted at the step S340 belongs among the recognition areas of the image signal. At step S342, the character recognition block 146 performs predetermined feature extraction from the character extracted at the step S340. At step S344, the block 146 calculates the similarity of the recognition object character to learned characters in the recognition dictionary 146a on the basis of the feature extracted at the step S342. At step S346, the block 146 selects the predetermined number of recognition candidate characters in the order of their amount, and sorts the recognition candidate characters. In addition, this number of recognition candidate characters is set in a number-of-recognition-candidate-characters register (not shown).

At step S348, the block 146 compares the similarity of the first candidate of the recognition candidate characters, that is, the recognition candidate character having the largest similarity, with the threshold for judgement of unrecognizableness in the recognition area, where the recognition candidate character is included, with using the unrecognizableness judging block 146b. If the similarity of the first candidate is less than the threshold for judgement of unrecognizableness in the recognition area where the recognition candidate character is included (NO at the step S348), the process goes to step S340a, where a predetermined identifier, that is, a rejection code is outputted with judging the recognition object character as an unrecognizable character. On the other hand, if the similarity of the first candidate is larger than the threshold for judgement of unrecognizableness in the recognition area where the recognition candidate character is included (YES at the step S348), the process goes to step S342a as successful recognition since it is possible to output at least one result of character recognition.

At the step S342a, two is substituted to a number-of-recognition-candidate-characters counter i (not shown)

counting the number of the recognition candidate characters processed. At step S344a, it is judged whether the content of the number-of-recognition-candidate-characters counter i exceeds the number of recognition candidate characters set in the number-of-recognition-candidate-characters register. If the content of the number-of-recognition-candidate-characters counter i exceeds the number of recognition candidate characters (YES at step S344a), the subsequent processing is stopped since there is no recognition candidate character over the number. Then, the process goes to step S346a. In addition, at the step S346a, all the character codes corresponding to the recognition candidate characters having similarity exceeding the threshold for judgement of unrecognizableness are outputted. On the other hand, if the content of the number-of-recognition-candidate-characters counter i does not exceed the number of recognition candidate characters (NO at the step S344a), the process goes to step S348a.

At the step S348a, similarity of the ith candidate is compared with the threshold for judgement of unrecognizableness in the recognition area where the recognition candidate character is included. If the similarity of the ith candidate is less than the threshold for judgement of unrecognizableness in the recognition area where the recognition candidate character is included (NO at the step S348a), the ith candidate and subsequent candidates are judged as unrecognizable characters. Then, the process goes to the step S346a. On the other hand, if the similarity of the ith candidate is larger than the threshold for judgement of unrecognizableness in the recognition area where the recognition candidate character is included (YES at the step S348a), the process goes to step S349a, where the number-of-recognition-candidate-characters counter i is incremented and the process returns to the step S344a.

In addition, the number-of-recognition-candidate-characters register and number-of-recognition-candidate-characters counter are implemented, for example, in the RAM mounted in the central control unit 200, or are constructed with dedicated hardware.

Owing to above processing, the rejection ratio judged in each recognition area of the image signal that is shown by the manuscript ID has the tendency shown in FIG. 17. Thus, if the rejection ratio is high, the correct solution ratio of characters judged as recognizable characters increase, but their number is few. On the contrary, if the rejection ratio is low, the number of characters judged as recognizable characters is large, but the correct solution ratio of the characters also decreases. Then, in the fourth embodiment, in order that character recognition in the mobile terminal 140 may be executed at an optimum rejection ratio, the threshold controller 144 of the central control unit 240 sets the threshold for judgement of unrecognizableness optimum for each recognition area of the image signal, which is shown by the manuscript ID, on the basis of the result of manuscript ID recognition in the manuscript ID recognition block 147 of the mobile terminal 140.

Figure 10:
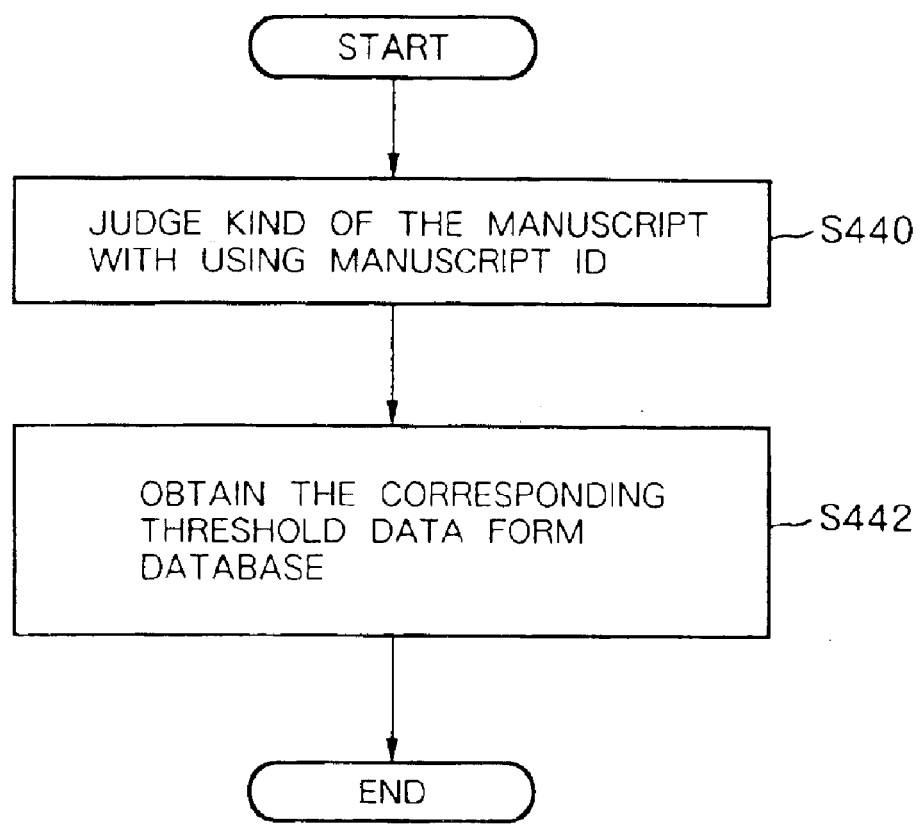
FIG. 10 is a flow chart showing processing executed in a threshold controller of the fourth embodiment according to the present invention.

FIG. 10 is a flow chart showing the processing executed in the threshold controller of the fourth embodiment of the present invention.

At step 440, the manuscript ID of the image signal of the recognition object is judged according to the result of manuscript ID recognition received in the character recognition result & manuscript ID receiver 242. At step S442, data (a threshold for judgement of unrecognizableness and positional information of each recognition area included in the image signal of the recognition object) corresponding to the manuscript ID judged at the step S440 is obtained from the threshold database 244a.

As described above, according to the fourth embodiment, it is possible to increase recognition accuracy in each recognition area. This is because the central control unit 240 can set a threshold for judgement of unrecognizableness that is optimum for each recognition area of the image signal inputted in the mobile terminal 140, on the basis of the result of manuscript ID recognition inputted from the mobile terminal 140. In particular, in case that characters, whose writers are different, or different fonts are mixed in the same read manuscript, or a format of a read manuscript changes, the present invention can perform excellently accurate character recognition of the read manuscript, and can largely increase the efficiency of processing.

Although, in the fourth embodiment, the number of recognition candidate characters that the character recognition block 146 of the mobile terminal 140 outputs is plural, the present invention is not limited to this. For example, with selecting a recognition candidate character having the largest similarity as only one recognition candidate character, the unrecognizableness judging block 146b can perform judgement. In this case, it becomes possible to accelerate the processing.

Although, in the fourth embodiment, the communication system composed of the mobile terminal 140 and central control unit 240 that are connected via the wireless network 340 is described, the present invention is not limited to this. For example, there is no problem even if a communication system is composed of terminals and a central control unit 240 that are connected via a wired network, internet, intranet and etc.

<Embodiment 5>

Figure 11:
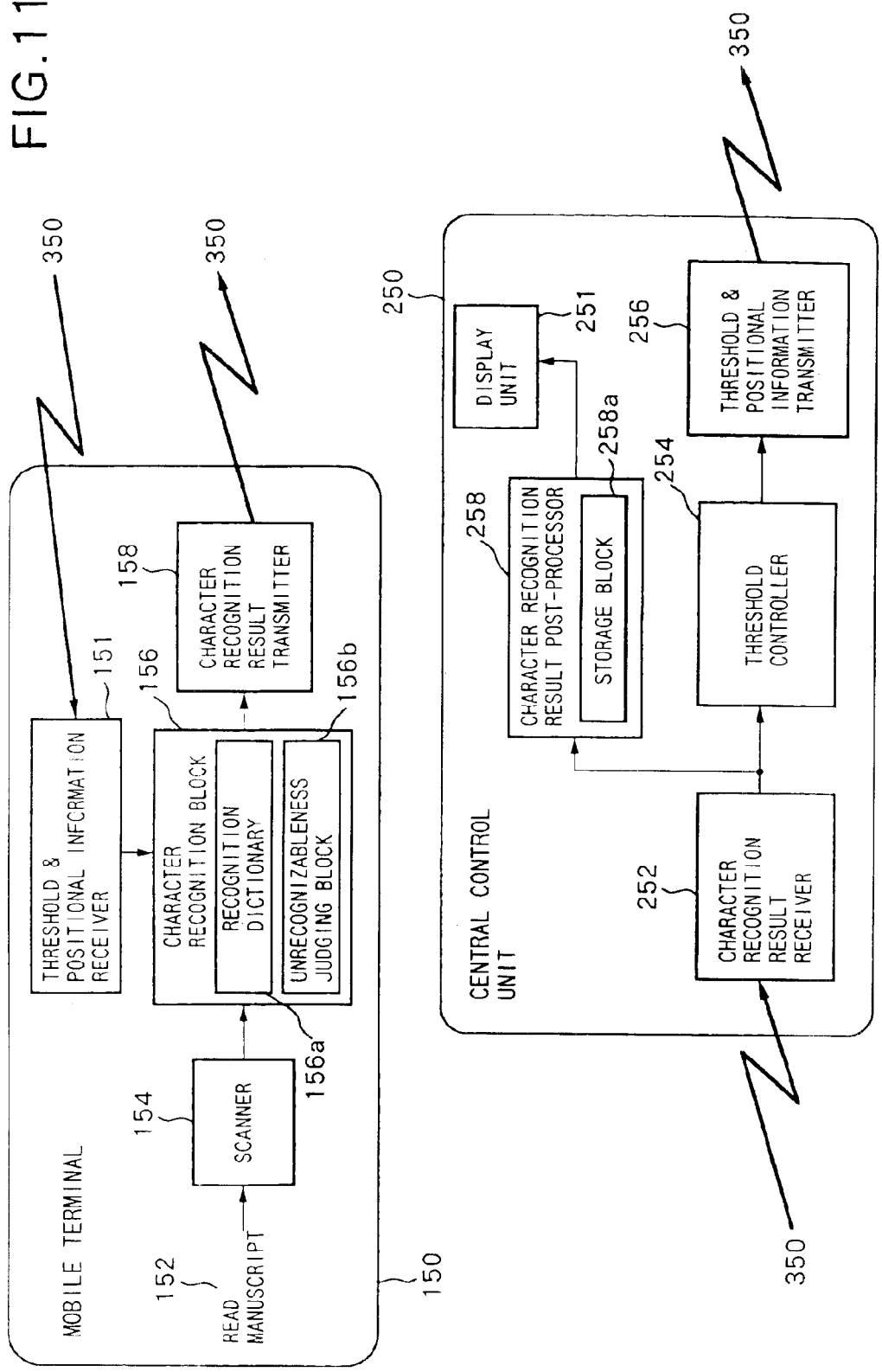
FIG. 11 is a block diagram showing the construction of a communication system of a fifth embodiment according to the present invention.

FIG. 11 is a block diagram showing the construction of a communication system of a fifth embodiment according to the present invention.

As shown in FIG. 11, the communication system is composed of a mobile terminal 150 and a central control unit 250. In addition, the mobile terminal 150 and central control unit 250 are connected via a wireless network 350. Furthermore, here, one mobile terminal 150 and one central control unit 250 constructs the communication system, but the present invention can be also applied to a case of a communication system comprising a plurality of mobile terminals 150. Moreover, in case each mobile terminal among the plurality of mobile terminals 150 communicates with the central control unit 250, the central control unit 250 can identify each mobile terminal by starting communication, for example, after each mobile terminal issuing an identification signal different from others to the central control unit 250.

In a mobile terminal 150, symbol 152 shows a read manuscript. Symbol 154 shows a scanner reading the read manuscript 152 and generating an image signal. Symbol 156 shows a character recognition block that recognizes a recognition area of the image signal generated by the scanner 154 and performing character recognition in the recognition area, which is recognized, with using a recognition dictionary 156a. Symbol 156b shows a unrecognizableness judging block judging whether a recognition candidate character outputted by the character recognition block 156 is unrecognizable, on the basis of a threshold for judgement of unrecognizableness. Symbol 158 shows a character recognition result transmitter transmitting the result of character recognition by the character recognition block 156 and positional information showing the recognition area to the central control unit 250. Symbol 151 shows the threshold & positional information receiver receiving the positional information showing the recognition area of the image signal and a threshold for judgement of unrecognizableness in the recognition area from the central control unit 250.

In the central control unit 250, symbol 252 shows a character recognition result receiver receiving the result of character recognition and positional information from the mobile terminal 150. Symbol 258 is a character recognition result post-processor performing post-processing of the result of character recognition received by the character recognition result receiver 252. Symbol 258a shows a storage block storing data such as processing-result by the character recognition result post-processor 258. Symbol 251 shows a display unit displaying the processing-result by the character recognition result post-processor 258. Symbol 254 shows a threshold controller that judges the number of results of character recognition in each recognition area in the image signal of the recognition object, which is shown by the positional information received by the character recognition result receiver 252, and sets a threshold for judgement of unrecognizableness optimum for each recognition area in the unrecognizableness judging block 156b of the mobile terminal 150. Symbol 256 shows a threshold & positional information transmitter transmitting positional information and a threshold for judgement of unrecognizableness of each recognition area in the image signal, which is set in the threshold controller 254, to the mobile terminal 150.

In addition, in each of the mobile terminal 150 and central control unit 250, a CPU, RAM, and ROM, which are not shown, are mounted. A CPU mounted in each terminal executes various programs after developing the various programs that are stored in the ROM and is used for controlling equipment. In addition, the RAM also functions as a working area and a temporary save area.

Next, the operation of the communication system of the fifth embodiment will be described with reference to FIG. 11.

From the read manuscript 152 prepared in the mobile terminal 150, an image signal corresponding to the read manuscript 152 is generated by the scanner 154. The image signal generated is sent to the character recognition block 156, where a recognition area is recognized and character recognition in the recognition area recognized is performed. The threshold & positional information receiver 151 receives the positional information of and the threshold for judgement of unrecognizableness for each recognition area in the image signal of a recognition object, which is set in the threshold controller 254 of the central control unit 250, via the wireless network 350. Here, character recognition block 156 compares a threshold for judgement of unrecognizableness in each recognition area of the image signal received by the threshold & positional information receiver 151 and the similarity of the recognition candidate character in each recognition area. As a result of comparison, if the similarity of the recognition candidate character is larger than the threshold for judgement of unrecognizableness, the block 156 outputs a character code corresponding to the recognition candidate character as the recognition result. On the other hand, if the similarity of the recognition candidate character is less than the threshold for judgement of unrecognizableness, the block 156 outputs a predetermined rejection code as an unrecognizable character. In addition, the processing executed in the character recognition block 156 will be described in detail later. The character recognition result transmitter 158 transmits a character code, which is the result of character recognition by the character recognition block 156, and the rejection code showing unrecognizableness, to the central control unit 250 via the wireless network 350.

On the other hand, in the central control unit 250, first, the character recognition result receiver 252 receives the result of character recognition and positional information that are transmitted from the mobile terminal 150. The result of character recognition received is corrected by the character recognition result post-processor 258, is stored by the storage block 258a, and is processed like searching data, stored in the storage block 258a, with using the result of character recognition as a key. The processing-result is displayed on the display unit 251. The threshold controller 254 sets a threshold for judgement of unrecognizableness that is optimum for each recognition area in the image signal of the recognition object, on the basis of the result of character recognition in each recognition area, which is shown by the positional information received. In addition, the processing executed in the threshold controller 254 will be described later in detail. The threshold for judgement of unrecognizableness for and positional information of each recognition area in the image signal of the recognition object, which is set in the threshold controller 254 is transmitted to the mobile terminal 150 by the threshold & positional information transmitter 256 via the wireless network 350.

Next, the processing executed in the fifth embodiment will be described with reference to FIGS. 12 and 13. In addition, here, in particular, the processing executed in the character recognition block 156 and threshold controller 254 that are important parts of the fifth embodiment will be described in detail.

Figure 12:
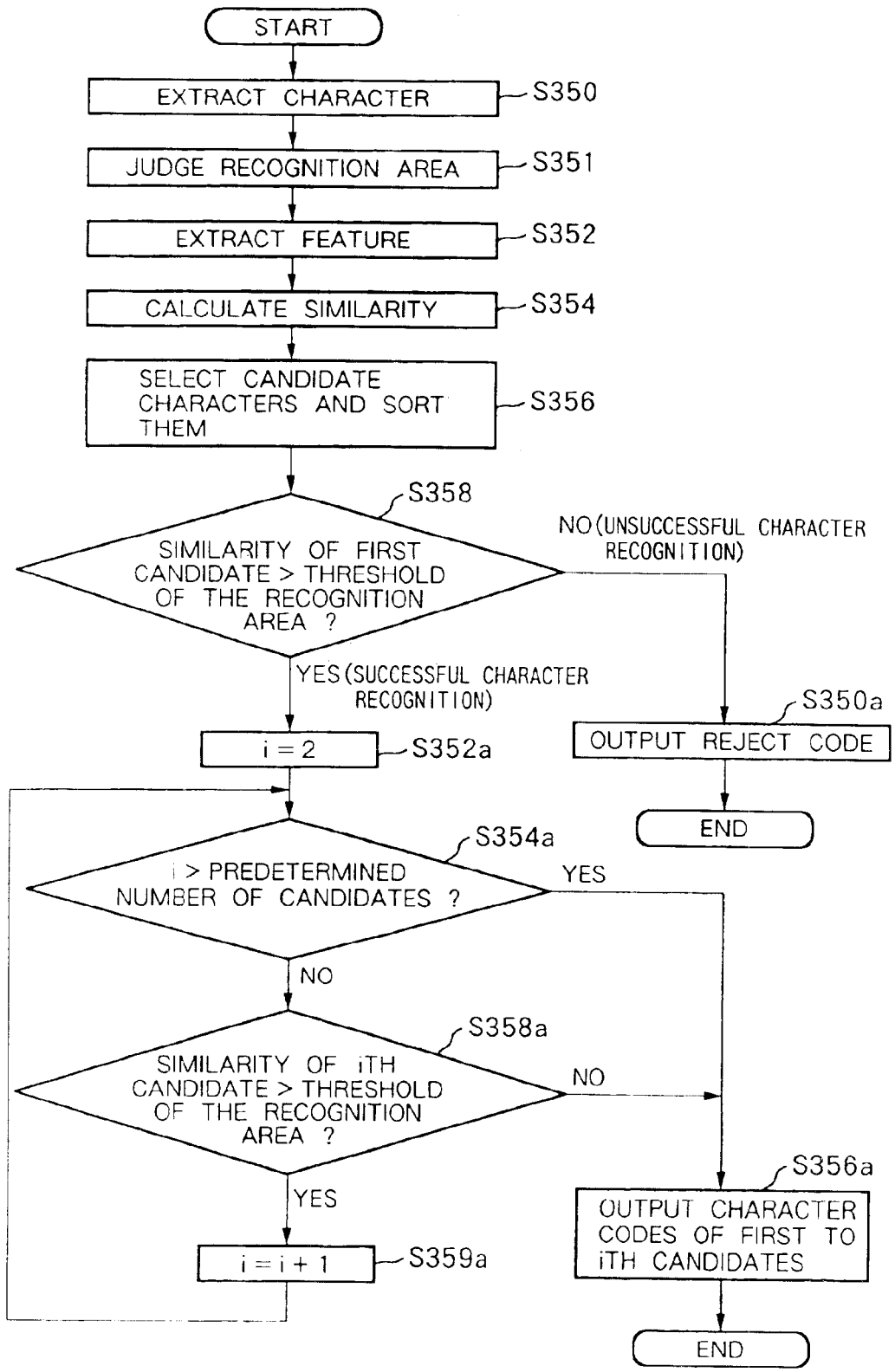
FIG. 12 is a flow chart showing processing executed in a character recognition block of the fifth embodiment according to the present invention.

FIG. 12 is a flow chart showing the processing executed in the character recognition block of a fifth embodiment according to the present invention.

First, at step S350, the character recognition block 156 performs character extraction in which characters are separated from the image signal inputted from the scanner 154. At step S351, the block 156 recognizes the recognition area in the image signal. Then, the block 156 judges on the basis of the recognition area, which is recognized, a recognition area where the character that is extracted at the step S350 belongs. At step S352, the character recognition block 156 performs predetermined feature extraction from the character extracted at the step S350. At step S354, the block 156 calculates similarity of the recognition object character to learned characters in the recognition dictionary 156a on the basis of the feature extracted at the step S352. At step S356, the block 156 selects the predetermined number of recognition candidate characters in the order of their amount, and sorts the recognition candidate characters. In addition, this number of recognition candidate characters is set in a number-of-recognition-candidate-characters register (not shown).

At step S358, the block 156 compares the similarity of the first candidate among the recognition candidate characters, that is, the recognition candidate character having the largest similarity with the threshold for judgement of unrecognizableness in the recognition area, where the recognition candidate character is included, with using the unrecognizableness judging block 156b. If the similarity of the first candidate is less than the threshold for judgement of unrecognizableness in the recognition area where the recognition candidate character is included (NO at the step S358), the process goes to step S350a, where a predetermined identifier, that is, a rejection code is outputted with judging the recognition object character as an unrecognizable character. On the other hand, if the similarity of the first candidate is larger than the threshold for judgement of unrecognizableness in the recognition area where the recognition candidate character is included (YES at the step S358), the process goes to step S352a as successful recognition since it is possible to output at least one result of character recognition.

At the step S352a, two is substituted to a number-of-recognition-candidate-characters counter i (not shown) counting the number of the recognition candidate characters processed. At step S354a, it is judged whether the content of the number-of-recognition-candidate-characters counter i exceeds the number of recognition candidate characters set in the number-of-recognition-candidate-characters register. If the content of the number-of-recognition-candidate-characters counter i exceeds the number of recognition candidate characters (YES at step S354a), the subsequent processing is stopped since there is no recognition candidate character over the number. Then, the process goes to step S356a. In addition, at the step S356a, all the character codes corresponding to the recognition candidate characters having similarity exceeding the threshold for judgement of unrecognizableness are outputted. On the other hand, if the content of the number-of-recognition-candidate-characters counter i does not exceed the number of recognition candidate characters (NO at the step S354a), the process goes to step S358a.

At the step S358a, similarity of the ith candidate is compared with the threshold for judgement of unrecognizableness in the recognition area where the recognition candidate character is included. If the similarity of the ith candidate is less than the threshold for judgement of unrecognizableness in the recognition area where the recognition candidate character is included (NO at the step S358a), the ith candidate and subsequent candidates are judged as unrecognizable characters. Then, the process goes to the step S356a. On the other hand, if the similarity of the ith candidate is larger than the threshold for judgement of unrecognizableness in the recognition area where the recognition candidate character is included (YES at the step S358a), the process goes to step S359a, where the number-of-recognition-candidate-characters counter i is incremented and the process returns to the step S354a.

In addition, the number-of-recognition-candidate-characters register and number-of-recognition-candidate-characters counter are implemented, for example, in the RAM mounted in the central control unit 250, or are constructed with dedicated hardware.

Owing to above processing, the rejection ratio judged in each recognition area of the image signal has the tendency shown in FIG. 17. Thus, if the rejection ratio is high, the correct solution ratio of characters judged as recognizable characters increase, but their number is few. On the contrary, if the rejection ratio is low, the number of characters judged as recognizable characters is large, but the correct solution ratio of the characters also decreases. Then, in the fifth embodiment, in order that character recognition in the mobile terminal 150 may be executed at an optimum rejection ratio, the threshold controller 154 of the central control unit 250 sets the threshold for judgement of unrecognizableness optimum for each recognition area of the image signal, on the basis of the result of character recognition in each recognition area by the character recognition block 156 of the mobile terminal 150.

Figure 13:
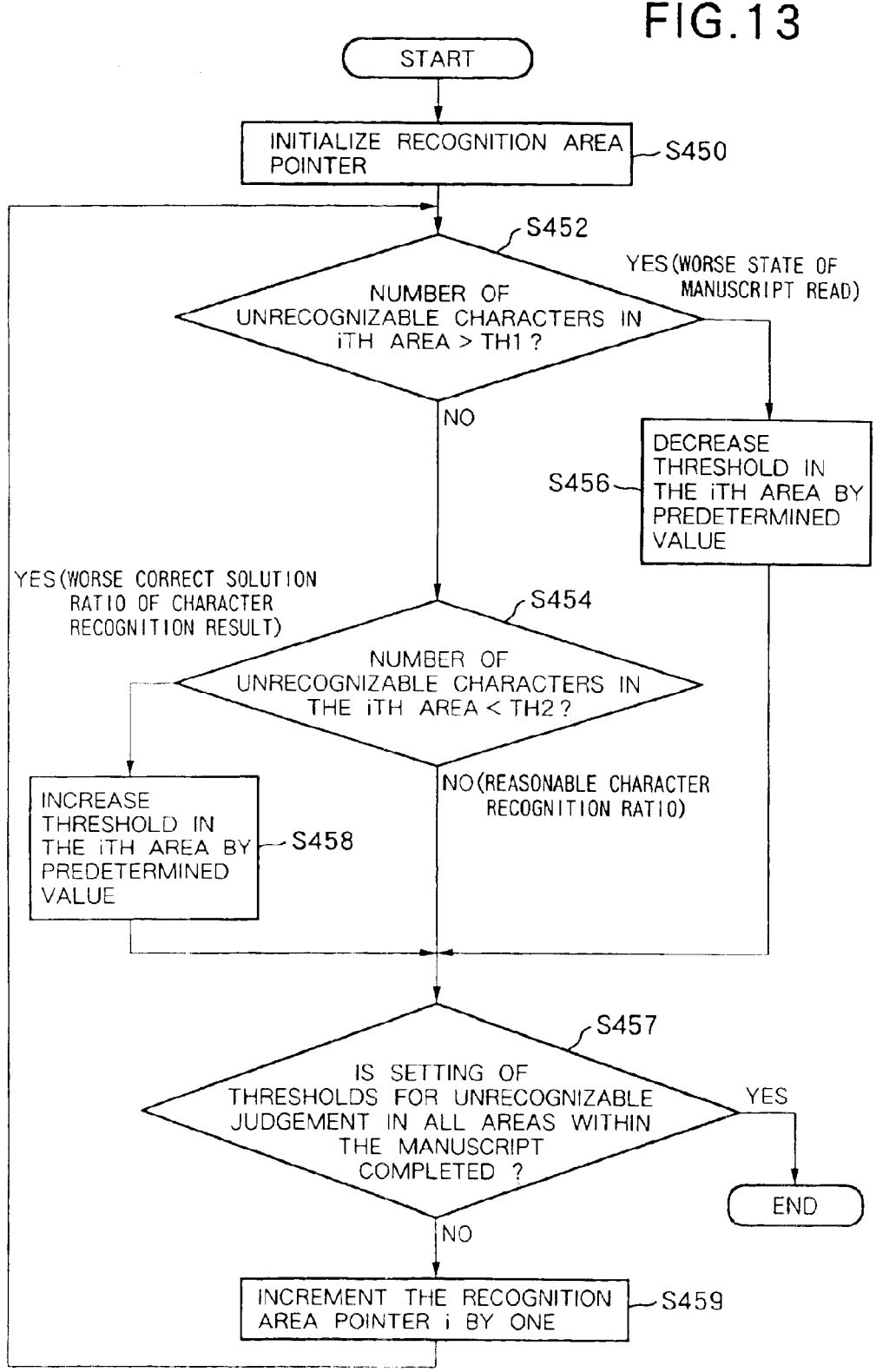
FIG. 13 is a flow chart showing processing executed in a threshold controller of the fifth embodiment according to the present invention.

FIG. 13 is a flow chart showing the processing executed in the threshold controller of the fifth embodiment of the present invention.

At step 450, the threshold controller 254 initializes a recognition area pointer i showing a recognition area of a processing object in an image signal. In addition, a number is assigned to each recognition area in the image signal in order, and the threshold controller 254 processes each recognition area according to a value shown by the recognition area pointer i. Furthermore, the number of the recognition areas in the image signal is stored in a number-of-recognition-areas register. At step S452, on the basis of the result of character recognition and positional information that is received by the character recognition result receiver 252, it is judged whether the number of unrecognizable characters (rejection codes) in the recognition area corresponding to the ith area that is shown by the recognition area pointer i is not less than the first threshold TH1. If the number of unrecognizable characters is not less than the first threshold TH1 (YES at the step S452), the controller 254 judges that the read condition of the scanner 154 in the mobile terminal 150 that reads the recognition area corresponding to the ith area becomes worse due to some reason. Then, the process goes to step S456. In addition, at the step S456, so as to increase the number of recognizable characters, the controller 254 resets the threshold for judgement of unrecognizableness to a value less than the current threshold for judgement of unrecognizableness in the recognition area corresponding to the ith area that is set in the unrecognizableness judging block 156b of the mobile terminal 150. After that, the process is ended.

On the other hand, if the number of unrecognizable characters is less than the first threshold TH1 (NO at the step S452), the process goes to step S454. At the step S454, it is judged whether the number of unrecognizable characters is less than the second threshold TH2 (<TH1). If the number of unrecognizable characters is less than the second threshold TH2 (YES at the step S454), the controller 254 judges that the correct solution ratio of the result of character recognition becomes worse, and the process goes to step S458. Then, at the step S458, so as to increase the correct solution ratio of recognition results, the controller 254 resets the threshold for judgement of unrecognizableness to a value that is larger than the current threshold for judgement of unrecognizableness in the recognition area corresponding to the ith area that is set in the unrecognizableness judging block 156b of the mobile terminal 150. After that, the process is ended.

On the other hand, if the number of unrecognizable characters in the recognition area corresponding to the ith area is not less than the second threshold TH2 (NO at the step S454), the controller 254 judges that the current threshold for judgement of unrecognizableness in the recognition area corresponding to the ith area, which is set in the unrecognizableness judging block 156b of the mobile terminal 150, is adequate, and ends the processing.

At step S457, the controller 254 judges whether setting of thresholds for judgement of unrecognizableness is completed in regard to all the recognition areas in the image signal. Thus, the controller 254 judges whether the value shown by the recognition area pointer i is equal to the value stored in the number-of-recognition-areas register. If the setting of thresholds for judgement of unrecognizableness is completed (YES at the step S457), the process is ended. On the other hand, if the setting of thresholds for judgement of unrecognizableness is not completed (NO at the step S457), the process goes to step S459. At the step S459, a value of the recognition area pointer i is incremented by one, and the process returns to the step S452.

In addition, the number-of-recognition-area pointer and number-of-recognition-area register are implemented, for example, in the RAM mounted in the central control unit 250, or are constructed with dedicated hardware.

As described above, according to the fifth embodiment, it is possible to increase recognition accuracy in each recognition area. This is because the central control unit 250 can set a threshold for judgement of unrecognizableness that is optimum for each recognition area of the image signal inputted in the mobile terminal 150, on the basis of the result of character recognition and recognition area that is inputted in the mobile terminal 150. In particular, in case that characters, whose writers are different, or different fonts are mixed in the same read manuscript, or a format of a read manuscript changes, the present invention can perform excellently accurate character recognition of the read manuscript, and can largely increase the efficiency of processing.

Although, in the fifth embodiment, the number of recognition candidate characters that the character recognition block 156 of the mobile terminal 150 outputs is plural, the present invention is not limited to this. For example, with selecting a recognition candidate character having the largest similarity as only one recognition candidate character, the unrecognizableness judging block 156b can perform judgement. In this case, it becomes possible to accelerate the processing.

Although, in the fifth embodiment, the communication system composed of the mobile terminal 150 and central control unit 250 that are connected via the wireless network 350 is described, the present invention is not limited to this. For example, there is no problem even if a communication system is composed of terminals and a central control unit 250 that are connected via a wired network, internet, intranet, and etc.

<Embodiment 6>

Figure 14:
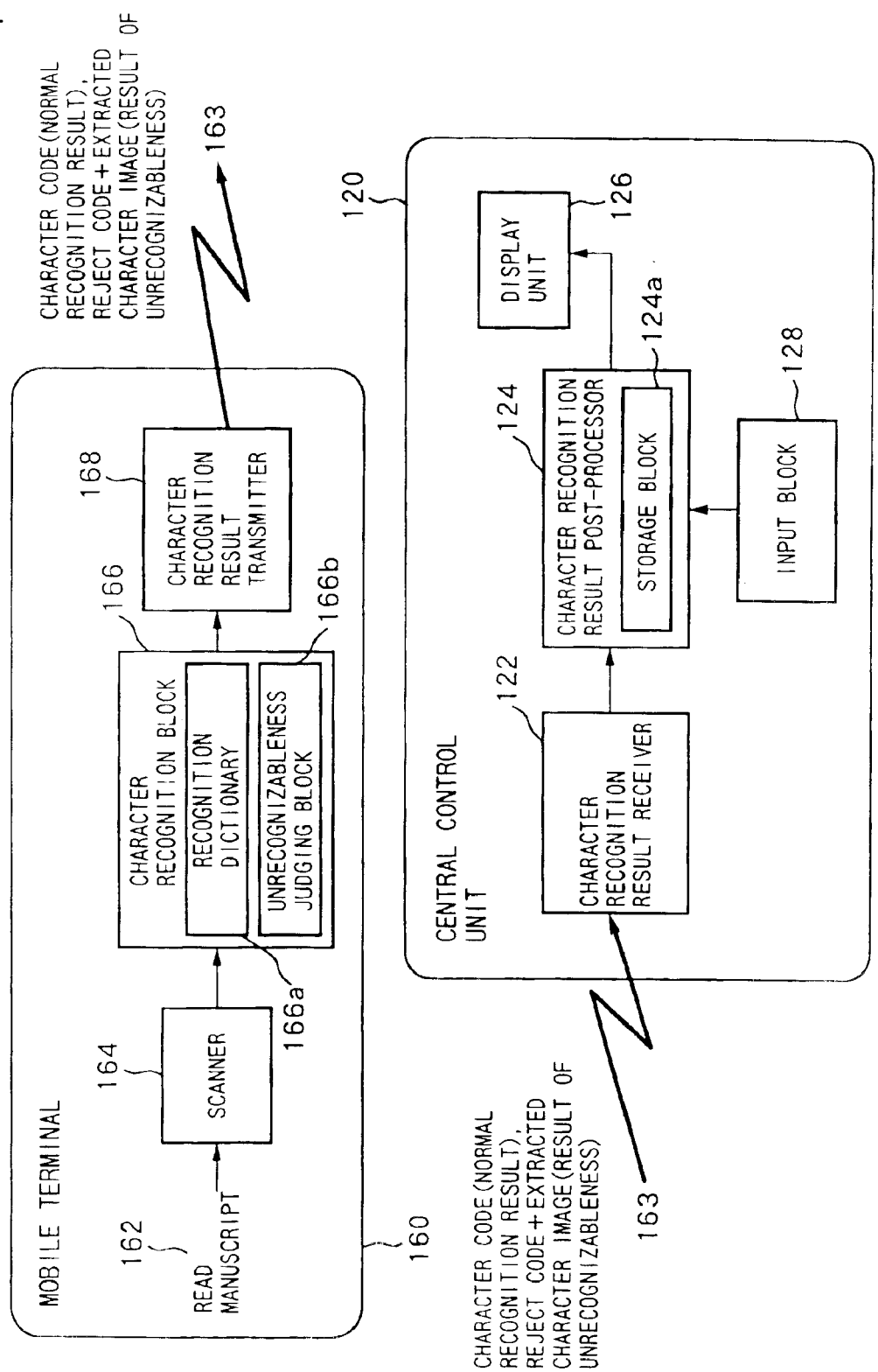
FIG. 14 is a block diagram showing the construction of a communication system of a sixth embodiment according to the present invention.

FIG. 14 is a block diagram showing the construction of a communication system of a sixth embodiment according to the present invention.

As shown in FIG. 14, the communication system is composed of a mobile terminal 160 and a central control unit 120. In addition, the mobile terminal 160 and central control unit 120 are connected via a wireless network 163. Furthermore, here, one mobile terminal 160 and one central control unit 120 constructs the communication system, but the present invention can be also applied to a case of a communication system comprising a plurality of mobile terminals 160. Moreover, in case each mobile terminal of the plurality of mobile terminals 160 communicates with the central control unit 120, the central control unit 120 can identify each mobile terminal by starting communication, for example, after each mobile terminal issuing an identification signal different from others to the central control unit 120.

In a mobile terminal 160, symbol 162 shows a read manuscript. Symbol 164 shows a scanner reading the read manuscript 162 and generating an image signal. Symbol 166 shows a character recognition block performing character recognition of the image signal generated in the scanner 164 with using a recognition dictionary 166a. Symbol 166b shows an unrecognizableness judging block judging whether a character recognition candidate outputted by the character recognition block 166 is unrecognizable, on the basis of a threshold for judgement of unrecognizableness. Symbol 168 shows a character recognition result transmitter transmitting the result of character recognition by the character recognition block 166 to the central control unit 120.

In the central control unit 120, symbol 122 shows a character recognition result receiver receiving the result of character recognition from the mobile terminal 160. Symbol 124 is a character recognition result post-processor performing post-processing of the result of character recognition received by the character recognition result receiver 122.

Symbol 124a shows a storage block storing data such as a processing-result by the character recognition result post-processor 124. Symbol 126 shows a display unit displaying the processing-result by the character recognition result post-processor 124. Symbol 128 shows an input block for performing edition of the processing result, which is displayed on the display unit 126, such as correction.

In addition, in each of the mobile terminal 160 and central control unit 120, a CPU, RAM, and ROM, which are not shown, are mounted. A CPU mounted in each terminal executes various programs after developing the various programs which are stored in the ROM and is used for controlling equipment. In addition, the RAM also functions as a working area and a temporary save area.

Next, the operation of the communication system of the sixth embodiment will be described with reference to FIG. 14.

From the read manuscript 162 prepared in the side of the mobile terminal 160, an image signal corresponding to the read manuscript 162 is generated by the scanner 164. The image signal generated is sent to the character recognition block 166, where character recognition is performed. Here, the character recognition block 166 compares a threshold for judgement of unrecognizableness with similarity of each recognition candidate character. If the similarity of the recognition candidate character is larger than the threshold for judgement of unrecognizableness as a result of the comparison, the character recognition block 166 outputs a character code, corresponding to the recognition candidate character, as a recognition result. On the other hand, if the similarity of the recognition candidate character is less than the threshold for judgement of unrecognizableness, a predetermined rejection code and an image data corresponding to the unrecognizable character are transmitted to the central control unit 120 via the wireless network 163.

On the other hand, in the central control unit 120, first, the character recognition result receiver 122 receives the result of character recognition transmitted from the mobile terminal 160. The result of character recognition received is corrected by the character recognition result post-processor 124, is stored by the storage block 124a, and is processed like searching data, stored in the storage block 124a, with using the result of character recognition as a key. The processing-result is displayed on the display unit 126. Furthermore, according to the processing result on the display unit 126, the processing result is edited with using the input block 128.

Next, the processing executed in the sixth embodiment will be described with reference to FIGS. 15 and 16. In addition, here, in particular, the processing executed in the character recognition block 166 and the character recognition result post-processor 124 that are important parts of the present invention will be described in detail.

Figure 15:
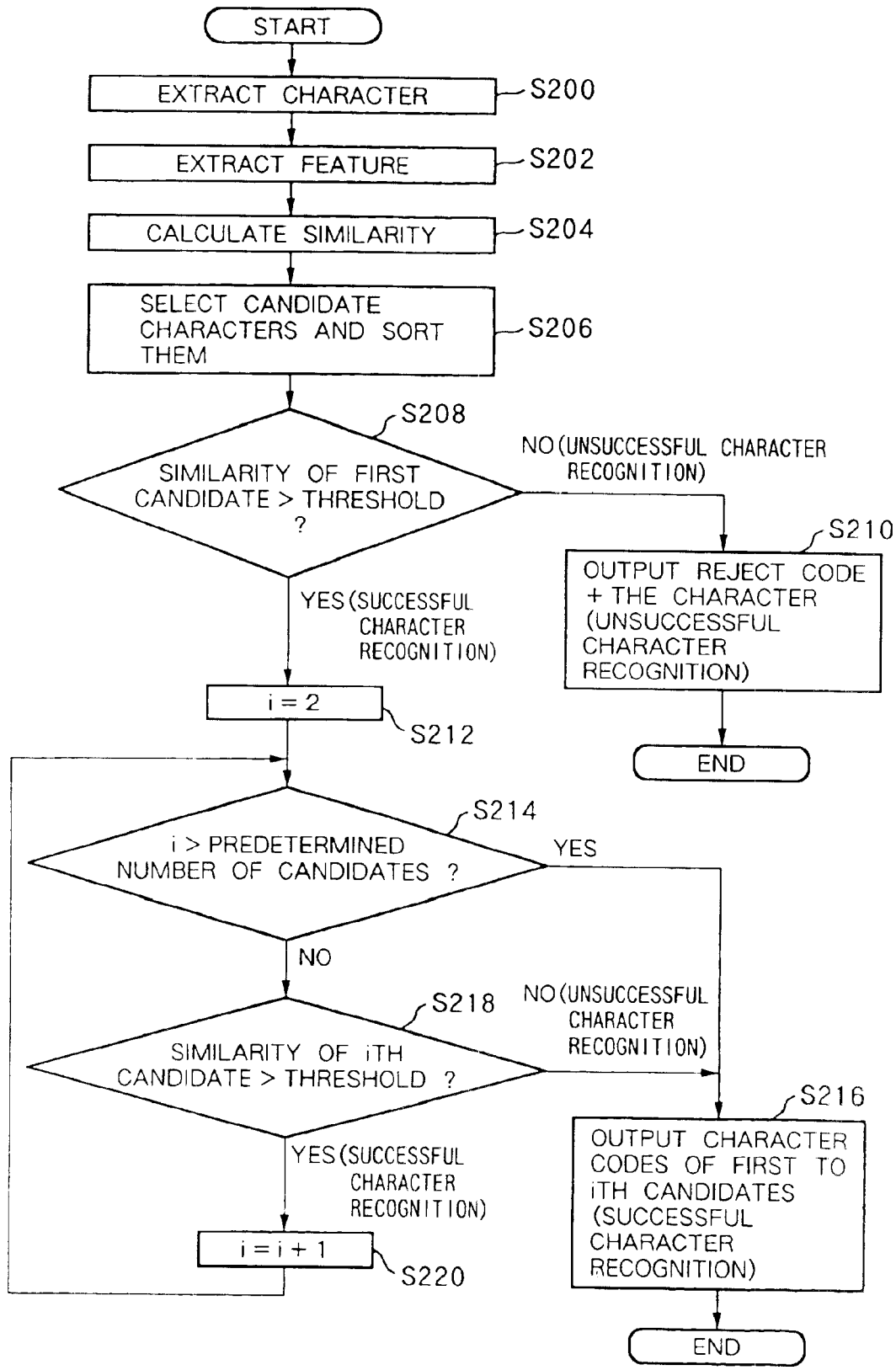
FIG. 15 is a flow chart showing processing executed in a character recognition block of the sixth embodiment according to the present invention.

FIG. 15 is a flow chart showing the processing executed in the character recognition block of the sixth embodiment according to the present invention.

First, at step S200, the character recognition block 166 in the mobile terminal 160 performs character extraction in which characters are separated from the image signal inputted from the scanner 164. Concretely, relative coordinate values of the recognized object character in the image signal are obtained. At step S202, the character recognition block 166 performs predetermined feature extraction from the character separated at the step S200. At step S204, the block 166 calculates the similarity of the image signal of the recognition object character to learned characters in the recognition dictionary 166a on the basis of the feature extracted at the step S202. At step S206, the block 166 selects the predetermined number of recognition candidate characters in the order of their amount, and sorts the recognition candidate characters. Furthermore, this number of recognition candidate characters is set in a number-of-recognition-candidate-characters register (not shown).

At step S208, the block 166 compares the similarity of the first candidate of the recognition candidate characters, that is, the recognition candidate character having the largest similarity with the threshold for judgement of unrecognizableness with using the unrecognizableness judging block 166b. If the similarity of the first candidate is less than the threshold for judgement of unrecognizableness (NO at the step S208), the process goes to step S210, where a predetermined identifier, that is, a rejection code is outputted with judging the recognition object character as an unrecognizable character. In addition, the block 166 outputs also the image data corresponding to the recognition object character at this time. On the other hand, if the similarity of the first candidate is larger than the threshold for judgement of unrecognizableness (YES at the step S208), the process goes to step S212 as successful recognition since it is possible to output at least one result of character recognition.

At the step S212, two is substituted to a number-of-recognition-candidate-characters counter i (not shown) counting the number of the recognition candidate characters processed. At step S214, it is judged whether the content of the number-of-recognition-candidate-characters counter i exceeds the number of recognition candidate characters set in the number-of-recognition candidate-characters register. If the content of the number-of-recognition-candidate-characters counter i exceeds the number of recognition candidate characters (YES at step S214), the subsequent processing is stopped since there is no recognition candidate character over the number. Then, the process goes to step S216. In addition, at the step S216, all the character codes corresponding to the recognition candidate characters having similarity exceeding the threshold for judgement of unrecognizableness are outputted. On the other hand, if the content of the number-of-recognition-candidate-characters counter i does not exceed the number of recognition candidate characters (NO at the step S214), the process goes to step S218.

At the step S218, the similarity of the ith candidate is compared with the threshold for judgement of unrecognizableness. If the similarity of the ith candidate is less than the threshold for judgement of unrecognizableness (NO at the step S218), the ith candidate and subsequent candidates are judged as unrecognizable characters. Then, the process goes to the step S216. On the other hand, if the similarity of the ith candidate is larger than the threshold for judgement of unrecognizableness (YES at the step S218), the process goes to step S220, where the number-of-recognition-candidate-characters counter i is incremented and the process returns to the step S214.

In addition, the number-of-recognition-candidate-characters register and number-of-recognition-candidate-characters counter are implemented, for example, in the RAM mounted in the central control unit 120, or are constructed with dedicated hardware.

Figure 16:
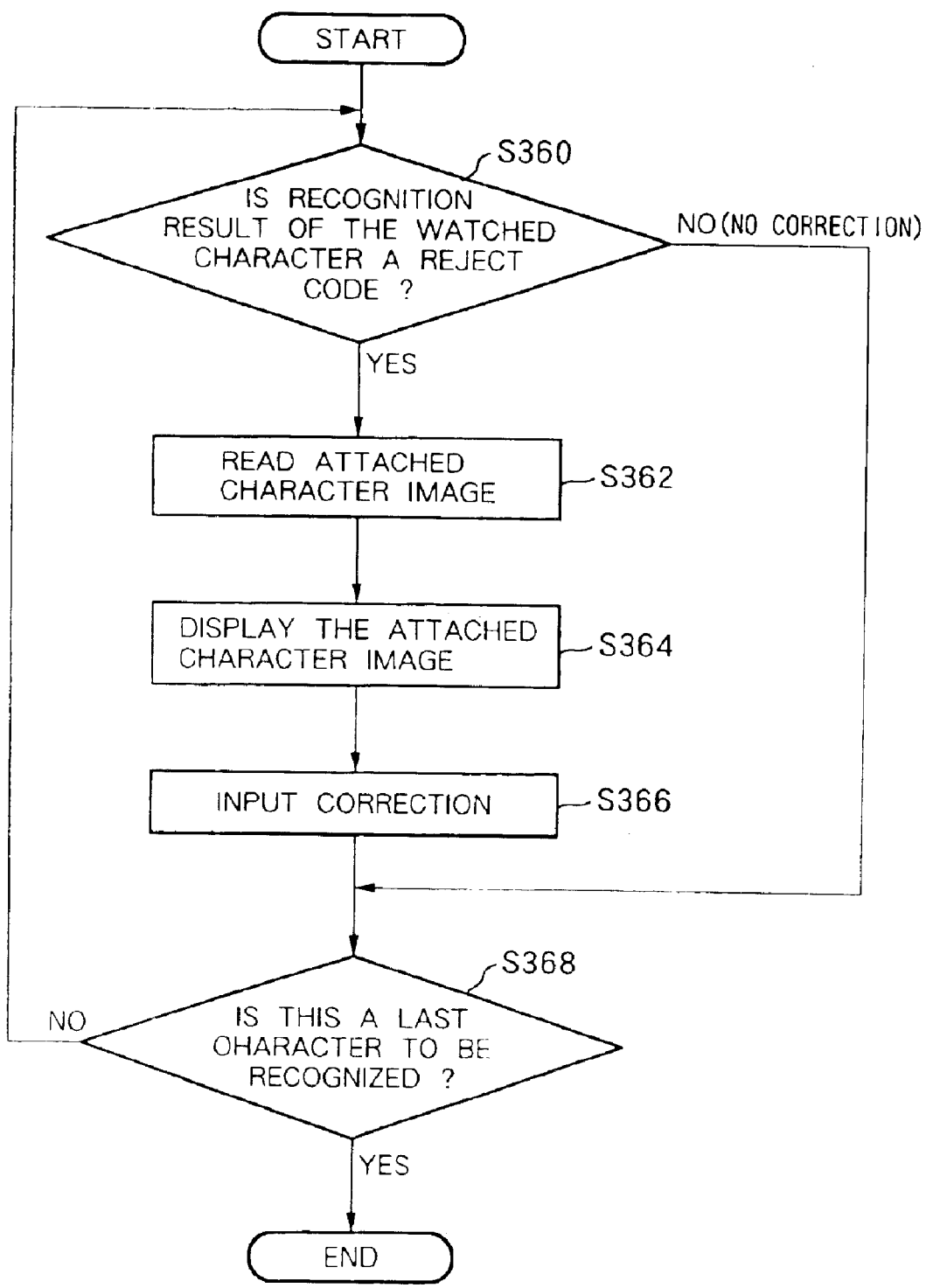
FIG. 16 is a flow chart showing processing executed in a character recognition result post-processor of the sixth embodiment according to the present invention.

FIG. 16 is a flow chart showing the processing executed in the character recognition result post-processor of the sixth embodiment of the present invention.

At step S360, the character recognition result post-processor 124 judges whether the result of character recognition of the watched character is the rejection code on the basis of the result of character recognition received from the character recognition result receiver 122. If the result of character recognition is not the rejection code (NO at step S360, that is, the result of character recognition is a normal character code, the process goes to step S368 as no necessity of correction. On the other hand, if the result is the rejection code (YES at the step S360), the process goes to step S362 since the watched character should be corrected due to unrecognizableness. At the step S362, the post-processor 124 develops the image data that corresponds to the unrecognizable character and is sent with the rejection code in the working memory of the storage block 124a. At step S364, the post-processor 124 makes the image data developed in the working memory displayed on the display unit 126. By an operator observing the image data corresponding to the unrecognizable character, displayed on the display unit 126, at step S366, the post-processor 124 accepts a correction input of a correct solution character from the input block 128. At step S368, the post-processor 124 judges whether the watched character is the last result of character recognition among results of character recognition received. If the watched character is not the last result of character recognition (No at the step S368), the process returns to the step S360. On the other hand, if being the last one (YES at the step S368), the process is ended.

As described above, according to the sixth embodiment, in regard to a character, which is judged as a unrecognizable character by the character recognition block 166 of the mobile terminal 160, its image data is transmitted with the rejection code to the central control unit 120. Owing to this, in the central control unit 120, it is possible to directly perform edition such as correction of the result of character recognition that becomes the rejection code as an unrecognizable character. Therefore, it becomes possible to sharply increase processing efficiency in the character recognition result post-processor 124. Furthermore, since only the image data of an unrecognizable character is transmitted from the mobile terminal 160 to the central control unit 120, it becomes possible to suppress the increase of communication load to a minimum.

Although the sixth embodiment has the construction of the mobile terminal 160 transmitting image data, corresponding to a unrecognizable character, with a rejection code to the central control unit 120, the present invention is not limited to this. For example, the present invention can have the construction of transmitting image data to the central control unit 120 after performing compression processing such as JPEG, JBIG, and MMR in the mobile terminal 160, and decompressing the image data compressed. In this case, a data amount can be reduced.

Although, in the sixth embodiment, the number of recognition candidate characters that the character recognition block 166 of the mobile terminal 160 outputs is plural, the present invention is not limited to this. For example, with selecting a recognition candidate character having the largest similarity as only one recognition candidate character, the unrecognizableness judging block 166b can perform judgement. In this case, it becomes possible to accelerate the processing.

Although, in the sixth embodiment, the communication system composed of the mobile terminal 160 and central control unit 120 that are connected via the wireless network 136 is described, the present invention is not limited to this. For example, there is no problem even if a communication system is composed of terminals and a central control unit that are connected via a wired network internet, intranet and etc.

In addition, the present invention can be applied to a system composed of plural equipment (for example, a host computer, interface equipment, a reader, a printer, etc.), or single equipment (for example, a copy machine, a facsimile, etc.).

It is needless to say that the objects of the present invention can be achieved by supplying to a system or equipment a recording medium where program code of software realizing the functions of the sixth embodiment described above is recorded, and by a computer (or a CPU or a MPU) of the system or equipment reading and executing the program code recorded on the recording medium.

In this case, the program code itself, which is read form the recording medium, realizes the functions of the sixth embodiment described above, and the recording medium, where the program code is recorded, constructs the present invention.

It is possible to use, for example, a floppy disk, a hard disk, an optical disk, a magneto-optical disk, a CD-ROM, a CD-R, a magnetic tape, a non-volatile memory card, ROM, and the like as a recording medium for supplying the program code.

In addition, it is also needless to say that this includes a case that not only the functions of the embodiment described above are realized by the computer executing the program code read, but also the functions of the sixth embodiment described above are realized by an OS (operating system), which runs in the computer, performing a part or all of actual processing according to the instruction of the program code.

Furthermore, it is also needless to say that this includes a case that the functions of the embodiment described above are realized by a CPU, which is included in a function enhancement board or a function enhancement unit, performing a part or all of actual processing on the basis of program code, after the program code read from a recording medium is written in memory provided in the function enhancement board inserted in a computer or the function enhancement unit connected to a computer.

What is claimed is:

1. A communication system comprising a terminal and a central control unit, said terminal comprising:
    image obtaining means for obtaining an image of a manuscript by scanning the manuscript, wherein an image of a manuscript ID is included in the obtained image of the manuscript;
    manuscript ID recognition means for recognizing the image of the manuscript ID included in the image of the manuscript and obtaining the manuscript ID as the recognition result of the image of the manuscript ID, the manuscript ID indicating information for an identification of the manuscript;
    first transmitting means for transmitting the manuscript ID obtained by said manuscript ID recognition means to said central control unit, wherein said first transmitting means does not transmit image data corresponding to unrecognized areas of the manuscript to said central control unit;
    first receiving means for receiving a control signal from said central control unit, the control signal including an information of character recognizing condition of the manuscript determined by the central control unit based on the manuscript ID transmitted by said first transmitting means, the information of character recognizing condition including positional information of recognition areas of the image of the manuscript; and
    character recognition means for performing character recognition of character images included in the image of the manuscript in accordance with the information of character recognizing condition included with the control signal, said central control unit comprising:
    second receiving means for receiving the manuscript ID without the image of the manuscript, the manuscript ID being transmitted from said first transmitting means;
    obtaining means for obtaining the information of character recognizing condition based on the manuscript ID received by said second receiving means, the information of character recognizing condition including positional information of recognition areas of the manuscript; and
    second transmitting means for transmitting the control signal including the information of character recognizing condition obtained by said obtaining means to said first receiving means of said terminal.

2. The communication system according to claim 1, wherein said character recognition means determines recognition candidate characters corresponding to the image of the manuscript in accordance with the information of character recognition condition included with the control signal and outputs a predetermined number of recognition candidate characters in an order according to largeness of similarity of the recognition candidate characters.

3. The communication system according to claim 1, wherein said central control unit further comprises a database for managing the control signal for the information of character recognizing condition corresponding to the manuscript ID, wherein said obtaining means obtains from said database the control signal corresponding to the received manuscript ID.

4. The communication system according to claim 1, wherein the information of character recognizing condition includes positional information, showing each of plural recognition areas in the image of the manuscript, and recognition dictionary information showing a recognition dictionary used for recognition in each recognition area.

5. The communication system according to claim 1, wherein said character recognition means performs character recognition from the image of the manuscript and judges on the basis of threshold information included in the information of character recognizing condition whether a recognition candidate character included in the result of character recognition is unrecognizable and outputs the recognition candidate character when judged as recognizable.

6. The communication system according to claim 5, wherein said character recognition means judges whether the recognition candidate character included in the result of character recognition is unrecognizable by comparing the threshold information with a similarity of the recognition candidate character.

7. The communication system according to claim 6, wherein said character recognition means judges that the recognition candidate character is unrecognizable if the threshold information is larger than the similarity of the recognition candidate character.

8. The communication system according to claim 5, wherein said character recognition means outputs a predetermined code showing unrecognizableness when all of the recognition candidate character is judged as an unrecognizable character.

9. The communication system according to claim 3, wherein the information of character recognizing condition includes positional information, showing each of plural recognition areas in the manuscript, and threshold information for judgement of unrecognizableness in each recognition area.

10. A control method for a communication system that includes a terminal and a central control unit, said control method comprising the steps of:

obtaining an image of a manuscript using the terminal by scanning the manuscript, wherein an image of a manuscript ID is included in the obtained image of the manuscript;

recognizing the manuscript ID included in the image of the manuscript using the terminal and obtaining the manuscript ID as the recognition result of the image of the manuscript ID, the manuscript ID indicating information for an identification of the manuscript;

transmitting the manuscript ID obtained in said manuscript ID recognizing step to said central control unit, wherein the image of the manuscript is not transmitted from the terminal to the central control unit without transmitting image data corresponding to unrecognized areas of the manuscript;

obtaining an information of character recognizing condition using the central control unit based on the transmitted manuscript ID, the information of character recognizing condition including positional information of recognition areas of image data corresponding to unrecognized areas of the manuscript;

transmitting a control signal including the obtained information of character recognizing condition from the central control unit to the terminal; and performing character recognition of character images included in the image of the manuscript using the terminal in accordance with the information of character recognizing condition included with the transmitted control signal.

11. The control method for a communication system according to claim 10, wherein said character recognition step determines recognition candidate characters corresponding to the image of the manuscript in accordance with the information of character recognition condition included with the control signal and outputs a predetermined number of recognition candidate characters in an order according to largeness of similarity of the recognition candidate characters.

12. The control method for a communication system according to claim 10, wherein the central control unit includes a database for managing the control signal for the information of character recognizing condition corresponding to the manuscript ID, wherein said obtaining step obtains from the database the control signal corresponding to the received manuscript ID.

13. The control method for a communication system according to claim 10, wherein the information of character recognizing condition includes positional information, showing each of plural recognition areas in the image of the manuscript, and recognition dictionary information showing a recognition dictionary used for recognition in each recognition area.

14. The control method for a communication system according to claim 10, wherein said character recognition step performs character recognition from the image of the manuscript and judging on the basis of threshold information included in the information of character recognizing condition whether a recognition candidate character included in the result of character recognition is unrecognizable and outputs the recognition candidate character when judged as recognizable.

15. The control method for a communication system according to claim 14, wherein said character recognition step judges whether the recognition candidate character included in the result of character recognition is unrecognizable by comparing the threshold information with a similarity of the recognition candidate character.

16. The control method for a communication system according to claim 15, wherein said character recognition step judges that the recognition candidate character is unrecognizable if the threshold information is larger than the similarity of the recognition candidate character.

17. The control method for a communication system according to claim 14, wherein said character recognition step outputs a predetermined code showing unrecognizableness when all of the recognition candidate character is judged as an unrecognizable character.

18. The control method for a communication system according to claim 12, wherein the information of character recognizing condition includes positional information, showing each of plural recognition areas in the manuscript, and threshold information for judgement of unrecognizableness in each recognition area.

19. Computer-readable memory that stores program code for controlling a communication system that includes a terminal and a central control unit, said computer-readable memory comprising:

program code for obtaining an image of a manuscript using the terminal by scanning the manuscript, wherein an image of a manuscript ID is included in the obtained image of the manuscript;

program code for recognizing the image of the manuscript ID included in the image of the manuscript using the terminal and obtaining the manuscript ID as the recognition result of the image of the manuscript ID, the manuscript ID indicating information for an identification of the manuscript;

program code for transmitting the manuscript ID obtained by said manuscript ID recognition means to said central control unit, wherein the terminal does not transmit the image of the manuscript from the terminal to the central control unit;

program code for obtaining an information of character recognizing condition using the central control unit based on the transmitted manuscript ID, the information of character recognizing condition including positional information of recognition areas of the image of the manuscript;

program code for transmitting a control signal including the obtained information of character recognizing condition from the central control unit to the terminal; and program code for performing character recognition of character images included in the image of the manuscript using the terminal in accordance with the information of character recognizing condition included with the transmitted control signal.

20. A terminal that performs communication with a central control apparatus, said terminal comprising:

image obtaining means for obtaining image of a manuscript by scanning the manuscript, wherein an image of a manuscript ID is included in the obtained image of the manuscript;

manuscript ID recognition means for recognizing the image of the manuscript ID included in the image of the manuscript and obtaining the manuscript ID as the recognition result of the image of the manuscript ID, the manuscript ID indicating information for an identification of the manuscript;

transmitting means for transmitting the manuscript ID obtained by said manuscript ID recognition means to said central control unit, wherein said first transmitting means does not transmit image data corresponding to unrecognized areas of the manuscript to the central control apparatus;

receiving means for receiving a control signal from the central control apparatus, the control signal including an information of character recognizing condition of the manuscript determined by the central control apparatus based on the manuscript ID transmitted by said first transmitting means, the information of character recognizing condition including positional information of recognition areas of the image of the manuscript; and character recognition means for performing character recognition of character images included in the image of the manuscript in accordance with the information of character recognizing condition included with the control signal.

21. A central control apparatus that performs communication with a terminal, wherein said terminal comprises:

image obtaining means for obtaining an image of a manuscript by scanning the manuscript, wherein an image of a manuscript ID is included in the obtained image of the manuscript;

manuscript ID recognition means for recognizing the image of the manuscript ID included in the image of the manuscript and obtaining the manuscript ID as the recognition result of the image of the manuscript ID, the manuscript ID indicating information for an identification of the manuscript;

first transmitting means for transmitting the manuscript ID obtained by said manuscript ID recognition means to said central control apparatus, wherein said first transmitting means does not transmit image data corresponding to unrecognized areas of the manuscript to said central control apparatus;

first receiving means for receiving a control signal from said central control apparatus, the control signal including an information of character recognizing condition of the manuscript determined by the central control apparatus based on the manuscript ID transmitted by said first transmitting means, the information of character recognizing condition including positional information of recognition areas of the image of the manuscript; and character recognition means for performing character recognition of character images included in the image of the manuscript in accordance with the information of character recognizing condition included with the control signal, and wherein said central control apparatus comprising:

receiving means for receiving a manuscript ID transmitted from the terminal, wherein the manuscript ID is obtained by the terminal by recognizing a manuscript ID image included in a manuscript image obtained by scanning a manuscript, and wherein the manuscript ID is transmitted from the terminal without image data corresponding to unrecognized areas of the manuscript;

obtaining means for obtaining the information of character recognizing condition based on the received manuscript ID, the information of character recognizing condition including positional information of recognition areas of the manuscript; and transmitting means for transmitting a control signal including the obtained information of the character recognizing to the terminal, wherein the terminal performs character recognition of character images included in the image of the manuscript in accordance with the information of character recognizing condition included in the transmitted control signal.

* * * * *

UNITED STATES PATENT AND TRADEMARK OFFICE
CERTIFICATE OF CORRECTION

PATENT NO.    : 6,891,972 B2
DATED         : May 10, 2005
INVENTOR(S)   : Kaneda It is certified that error appears in the above-identified patent and that said Letters Patent is hereby corrected as shown below:

<u>Title page,</u>
Item [*] Notice, insert:
-- This patent issued on a continued prosecution application filed under 37 CFR 1.53(d), and is subject to the twenty year patent term provisions of 35 U.S.C. 154(a)(2). --.

<u>Drawings,</u>
Sheet 5, Fig. 5, and Sheet 10, Fig. 10, "WITH" should be deleted.

<u>Column 1,</u>
Line 39, "decrease." should read -- decreases --.

<u>Column 14,</u>
Line 50, "with" should be deleted.

<u>Column 15,</u>
Lines 17 and 38, "with" should be deleted.

<u>Column 18,</u>
Line 42, "with" should be deleted.

<u>Column 19,</u>
Line 8, "with" should be deleted.

<u>Column 24,</u>
Lines 8 and 56, "with" should be deleted.

<u>Column 27,</u>
Line 39, "constructs" should read -- construct --.

UNITED STATES PATENT AND TRADEMARK OFFICE
CERTIFICATE OF CORRECTION

PATENT NO. : 6,891,972 B2
DATED : May 10, 2005
INVENTOR(S) : Kaneda

It is certified that error appears in the above-identified patent and that said Letters Patent is hereby corrected as shown below:

Column 29,
Line 11, "with" should be deleted.

Signed and Sealed this

Eleventh Day of October, 2005

JON W. DUDAS
*Director of the United States Patent and Trademark Office*